US012731038B1

(12) United States Patent
Jackson et al.

(10) Patent No.: US 12,731,038 B1
(45) Date of Patent: Sep. 8, 2026

(54) SYSTEMS AND METHODS FOR GENERATING A REDUCED-ORDER SURROGATE MODEL USING GENETIC ALGORITHMS

(71) Applicant: Pattern Computer, Inc., Friday Harbor, WA (US)

(72) Inventors: Quinn Jackson, Vancouver (CA); Gavin Dean, Seattle, WA (US); Matthew T. Keener, Sammamish, WA (US)

(73) Assignee: Pattern Computer, Inc., Friday Harbor, WA (US)

( * ) Notice: Subject to any disclaimer, the term of this patent is extended or adjusted under 35 U.S.C. 154(b) by 915 days.

(21) Appl. No.: 17/204,165

(22) Filed: Mar. 17, 2021

Related U.S. Application Data

(60) Provisional application No. 62/990,888, filed on Mar. 17, 2020.

(51) Int. Cl.
*G06N 3/126* (2023.01)
*G06F 9/30* (2018.01)
*G06N 20/00* (2019.01)

(52) U.S. Cl.
CPC ........... *G06N 3/126* (2013.01); *G06F 9/3001* (2013.01); *G06N 20/00* (2019.01)

(58) Field of Classification Search
CPC ....... G06N 3/126; G06N 20/00; G06F 9/3001
See application file for complete search history.

(56) References Cited

U.S. PATENT DOCUMENTS

| | | | | |
|---|---|---|---|---|
| 4,935,877 | A | 6/1990 | Koza | |
| 5,255,345 | A | 10/1993 | Shaefer | |
| 6,859,796 | B1 * | 2/2005 | Seward | G06F 30/39 706/45 |
| 2019/0005390 | A1 * | 1/2019 | Stitt | G06N 7/01 |

OTHER PUBLICATIONS

Leitch, "Symbolic Regression: Survival of the Best Fit", 2019, PHUSE EU Connect, vol. 2019, pp. 1-9 (Year: 2019).*

(Continued)

*Primary Examiner* — Abdullah Al Kawsar
(74) *Attorney, Agent, or Firm* — Davis Wright Tremaine LLP

(57) ABSTRACT

A genetic algorithm is used to generate a reduced-order surrogate model (ROSM) that approximates a data set. A fitness value is determined, for each parent chromosome of a population of parent chromosomes, by applying the data set to a chromosome function constructed from a sequence of genes of said each parent chromosome. Each parent chromosome is then randomly assigned into either a first subpopulation or a second subpopulation. The first subpopulation is ordered based on their fitness values. A population of child chromosomes is then generated from the first and second subpopulations. The ROSM is represented by a chromosome function of the child chromosome having a highest fitness value of the population of child chromosomes. The chromosome function is constructed by parsing the genes of the corresponding chromosome, each of which stores a mathematical primitive. The ROSM may be outputted in human-readable format.

20 Claims, 17 Drawing Sheets

(56) References Cited

OTHER PUBLICATIONS

La Cava et al., "Genetic Programming with Epigenetic Local Search", 2015, GECCO '15: Proceedings of the 2015 Annual Conference on Genetic and Evolutionary Computation, vol. 2015, pp. 1055-1062 (Year: 2015).*

Kommenda et al., "Parameter identification for symbolic regression using nonlinear least squares", 2019, Genetic Programming and Evolvable Machines, vol. 21, pp. 471-501 (Year: 2019).*

Krepl, "Symbolic Regression and Genetic Programming", 2018, retrieved from https://jankrepl.github.io/symbolic-regression/ on Feb. 28, 2024 (Year: 2018).*

Gagne et al., "Genetic Programming, Validation Sets, and Parsimony Pressure", 2006, Lecture Notes in Computer Science, vol. 3905, pp. 109-120 (Year: 2006).*

Haeri et al., "Statistical genetic programming for symbolic regression", 2017, Applied Soft Computing, vol. 60, pp. 447-469 (Year: 2017).*

Immanuel Savio, Udit Kr. Chakraborty; Genetic Algorithm : An Approach on Optimization; Proceedings of the Fourth International Conference on Communication and Electronics Systems (ICCES 2019) IEEE Conference Record # 45898; IEEE Xplore ISBN: 978-1-7281-1261-9 (Year: 2019).*

Whitley, "A genetic algorithm tutorial" Statistics and Computing, vol. 4, Jun. 1994, 37 pages.

* cited by examiner $$P(x_1, x_2, x_3) = (\mathrm{abs}(1 + x_1^{563.253} + \cosh(0.3002\, x_2) + 1.554 \log(x_3))\ \%\ 2) + 1$$

```
[0:32] => {PA: 69.7% / 69.8%}{L: 0.303117}{RMSD: inf}{MAE: 8.97609e+260}{r: -nan(ind)}{tau-b: 0.302}:
    ~diagnosis = (((((perimeter_worst*((noise^perimeter_worst))))-((concave_points_mean-concave_points_worst))))+
          ((concave_points_worst*noise))) >= 0.139123
    [69.8% / 69.6%]

[1:32] => {PA: 92.0% / 92.1%}{L: 0.0799953}{RMSD: 127.236}{MAE: 118.856}{r: 0.833}{tau-b: 0.651}:
    ~diagnosis = (((((perimeter_worst*concave_points_worst))-((noise-perimeter_worst))))+((noise/perimeter_worst))) >= 119.639639
    [92.1% / 92.0%]

[2:32] => {PA: 93.7% / 93.7%}{L: 0.0631314}{RMSD: 17.81}{MAE: 13.4431}{r: 0.82}{tau-b: 0.64}:
    ~diagnosis = (((((perimeter_worst*concave_points_worst))+((concave_points_mean-concave_points_worst))))-
                 concave_points_worst) >= 13.32798
    [93.6% / 93.8%]

[3:32] => {PA: 93.9% / 93.9%}{L: 0.0612446}{RMSD: 18.2808}{MAE: 13.9248}{r: 0.82}{tau-b: 0.64}:
    ~diagnosis = (perimeter_worst*concave_points_worst) >= 13.95188
    [94.0% / 93.8%]

[4:32] => {PA: 94.4% / 94.4%}{L: 0.0562522}{RMSD: 27.4677}{MAE: 20.042}{r: 0.807}{tau-b: 0.644}:
    ~diagnosis = (((((((perimeter_worst+concave_points_worst))*((concave_points_worst+concave_points_mean)))) +
          ((concave_points_mean-concave_points_worst))))-concave_points_worst) >= 18.323312
    [94.4% / 94.5%]

[8:32] => {PA: 95.1% / 95.1%}{L: 0.049373}{RMSD: 1.78356}{MAE: 0.872029}{r: 0.715}{tau-b: 0.637}:
    ~diagnosis = (((perimeter_worst+concave_points_worst))*((concave_points_worst*concave_points_mean))) >= 0.706917
    [95.1% / 95.1%]

[9:32] => {PA: 95.6% / 95.6%}{L: 0.0443806}{RMSD: 28.0942}{MAE: 20.7171}{r: 0.808}{tau-b: 0.644}:
    ~diagnosis = (((perimeter_worst+concave_points_worst))*((concave_points_worst+concave_points_mean))) >= 19.408307
    [95.5% / 95.7%]

[19:32] => {PA: 95.8% / 95.8%){1.: 0.0424938}{RMSD: 28.2203}{MAE: 20.8478}{r: 0.808}{tau-b: 0.644}:
    ~diagnosis = (((perimeter_worst+concave_points_worst))*((concave_points_worst+concave_points_mean))) >= 19.557805
    [95.9% / 95.7%]
```

*FIG. 12*

| concave_points_mean | perimeter_worst | concave_points_worst | PREDICTED VALUE | ACTUAL VALUE | HIT |
|---|---|---|---|---|---|
| 0.07017 | 158.8 | 0.186 | 1 | 1 | 1 |
| 0.1279 | 152.5 | 0.243 | 1 | 1 | 1 |
| 0.074 | 153.2 | 0.1932 | 1 | 1 | 1 |
| 0.1028 | 136.8 | 0.2073 | 1 | 1 | 1 |
| 0.09756 | 125.1 | 0.2393 | 1 | 1 | 1 |
| 0.1203 | 136.1 | 0.1847 | 1 | 1 | 1 |
| 0.07593 | 161.4 | 0.1785 | 1 | 1 | 1 |
| 0.07752 | 132.7 | 0.1864 | 1 | 1 | 1 |
| 0.05252 | 105.5 | 0.1607 | 1 | 1 | 1 |
| 0.03384 | 99 | 0.1282 | 0 | 0 | 1 |
| 0.08994 | 170.1 | 0.2091 | 1 | 1 | 1 |
| 0.01504 | 67.03 | 0.06517 | 0 | 0 | 1 |
| 0.04375 | 65.5 | 0.175 | 0 | 0 | 1 |
| 0.02872 | 62.56 | 0.04786 | 0 | 0 | 1 |
| 0.05069 | 110.3 | 0.1383 | 1 | 1 | 1 |
| 0.06556 | 91.36 | 0.07407 | 0 | 0 | 1 |
| 0.108 | 150.1 | 0.2102 | 1 | 1 | 1 |
| 0.01863 | 87.78 | 0.07632 | 0 | 0 | 1 |
| 0.07064 | 109.4 | 0.1397 | 1 | 0 | 0 |
| 0.0335 | 82.96 | 0.08449 | 0 | 0 | 1 |
| 0.03485 | 85.51 | 0.1218 | 0 | 0 | 1 |
| 0.06021 | 89 | 0.1105 | 0 | 0 | 1 |
| 0.09479 | 130.3 | 0.2034 | 1 | 1 | 1 |
| 0.08665 | 145.4 | 0.1674 | 1 | 1 | 1 |
| 0.2012 | 180.9 | 0.2248 | 1 | 1 | 1 |
| 0.1149 | 148.7 | 0.1732 | 1 | 1 | 1 |
| 0.03088 | 97.17 | 0.1012 | 0 | 0 | 1 |
| 0.03003 | 86.26 | 0.06042 | 0 | 0 | 1 |
| 0.01329 | 97.19 | 0.06019 | 0 | 0 | 1 |
| 0.01786 | 76.25 | 0.05506 | 0 | 0 | 1 |
| 0.03483 | 97.67 | 0.09722 | 0 | 0 | 1 |

*FIG. 13*

```
[0:128] => {PA: 61.1% / 59.4%}{L: 3.18398e+12}{RMSD: 1.78437e+06}{MAE: 1.29683e+06}{r: -0.109}{tau-b: -0.167}:
    ~_V = ((pi*(3*(sphere_radius+cone height)-sqrt((3*sphere_radius+cone_height)*(sphere_radius+3*cone height))))
          ((cone_height*cone_radius)))

[1:128] => {PA: 61.1% / 59.9%}{L: 3.10953e+12}{RMSD: 1.76339e+06}{MAE: 1.27255e+06}{r: 0.003}{tau-b: 0.094}:
    ~_V = (((((pi*cone_radius*(cone_radius+sqrt(cone_height^2+cone_radius^2))))-(pi*(3*(sphere_radius+cone_height)-
          sqrt((3*sphere_radius+cone_height)*(sphere_radius+3*cone_height))))))-((cone_height*cone_radius)))

[2:128] => {PA: 78.6% / 74.4%}{L: 1.26982e+12}{RMSD: 1.12686e+06}{MAE: 723905}{r: 0.608}{tau-b: 0.57}:
    ~_V = ((((4/3*pi*(cone_radius*cone_height*sphere_radius))-pi))-((cone_radius*sphere_radius)))

[3:128] => {PA: 78.6% / 74.5%}{L: 1.25948e+12}{RMSD: 1.12227e+06}{MAE: 719976){r: 0.61}{tau-b: 0.558}:
    ~_V = ((((4/3*pi*(cone_radius*cone_height*sphere_radius))-((cone_height-sphere_radius))))+((cone_radius*sphere_radius)))

[4:128] => {PA: 81.8% / 78.3%}{L: 9.10681e+11}{RMSD: 954296}{MAE: 586467}{r: 0.69}{tau-b: 0.623}:
    ~_V = ((((4/3*pi*(cone_radius*cone_height*sphere_radius))+pi))-(cone_radius*sphere_radius*(1-sphere_radius)))

[5:128] => {PA: 99.3% / 93.7%}{L: 7.69574e+10}{RMSD: 277322}{MAE: 177063}{r: 0.99}{tau-b: 0.828):
    ~_V = ((4/3*pi*(sphere_radius^3))+((cone_radius*sphere_radius)))

[6:128] => {PA: 99.3% / 93.7%}{L: 7.66797e+10}{RMSD: 276911}{MAE: 177223}{r: 0.99}{tau-b: 0.841}:
    ~_V = ((4/3*pi*(sphere_radius^3))+((cone_radius*cone_height)))

[7:128] => {PA: 99.3% / 96.0%}{L: 3.08873e+10}{RMSD: 175748}{MAE: 103115}{r: 0.993}{tau-b: 0.869}:
    ~_V = ((4/3*pi*(sphere_radius^3))+(pi*(cone_radius^2)*(sphere_radius/3)))

[9:128] => {PA: 99.3% / 100.0%}{L: 0}{RMSD: 0.000182559}{MAE: 0.000120358}{r: 1}{tau-b: 1}:
    ~_V = ((4/3*pi*(sphere_radius^3))+(pi*(cone_radius^2)*(cone_height/3)))
```

FIG. 14

| sphere_radius | cone_radius | cone_height | PREDICTED VALUE | ACTUAL VALUE |
|---|---|---|---|---|
| 92 | 82 | 98 | 3951813.588 | 3951813.588 |
| 62 | 28 | 8 | 1004874.015 | 1004874.015 |
| 50 | 70 | 32 | 687799.3516 | 687799.3516 |
| 30 | 26 | 77 | 167606.0625 | 167606.0625 |
| 68 | 4 | 9 | 1317240.478 | 1317240.478 |
| 44 | 61 | 63 | 602305.0963 | 602305.0963 |
| 61 | 18 | 55 | 969436.8498 | 969436.8498 |
| 13 | 89 | 65 | 548368.1393 | 548368.1393 |
| 19 | 68 | 90 | 464532.6449 | 464532.6449 |
| 89 | 20 | 84 | 2988153.08 | 2988153.08 |
| 2 | 72 | 74 | 401755.2461 | 401755.2461 |
| 41 | 25 | 39 | 314221.05 | 314221.05 |
| 90 | 52 | 94 | 3319800.544 | 3319800.544 |
| 13 | 21 | 5 | 11511.84268 | 11511.84268 |
| 32 | 15 | 44 | 147625.5332 | 147625.5332 |
| 86 | 69 | 19 | 2759033.586 | 2759033.586 |
| 90 | 41 | 10 | 3071231.45 | 3071231.45 |
| 68 | 100 | 76 | 2112959.821 | 2112959.821 |
| 9 | 50 | 60 | 160133.2607 | 160133.2607 |
| 30 | 23 | 96 | 166278.216 | 166278.216 |
| 60 | 76 | 5 | 935021.7495 | 935021.7495 |
| 39 | 24 | 22 | 261744.9335 | 261744.9335 |
| 49 | 32 | 84 | 582882.7234 | 582882.7234 |
| 6 | 82 | 31 | 219186.825 | 219186.825 |
| 49 | 71 | 20 | 598385.4359 | 598385.4359 |
| 32 | 51 | 67 | 319750.2531 | 319750.2531 |
| 26 | 96 | 1 | 83273.14927 | 83273.14927 |
| 47 | 22 | 92 | 481522.378 | 481522.378 |
| 46 | 82 | 57 | 809077.3944 | 809077.3944 |
| 67 | 38 | 41 | 1321831.392 | 1321831.392 |
| 74 | 36 | 50 | 1765256.723 | 1765256.723 |
| 82 | 70 | 73 | 2684147.442 | 2684147.442 |
| 9 | 18 | 34 | 14589.55628 | 14589.55628 |
| 28 | 70 | 26 | 225365.2906 | 225365.2906 |
| 23 | 42 | 46 | 135938.8085 | 135938.8085 |
| 15 | 33 | 25 | 42647.12027 | 42647.12027 |
| 100 | 12 | 67 | 4198893.567 | 4198893.567 |
| 92 | 42 | 22 | 3302400.31 | 3302400.31 |

*FIG. 15*

SYSTEMS AND METHODS FOR GENERATING A REDUCED-ORDER SURROGATE MODEL USING GENETIC ALGORITHMS

RELATED APPLICATIONS

This application claims priority to U.S. Provisional Patent Application No. 62/990,888, filed Mar. 17, 2020, the entirety of which is incorporated herein by reference.

BACKGROUND

A reduced-order surrogate model is a model that mimics the behavior of a system, but with less computational resources than a "full" model. Reduced-order surrogate models can be used, for example, to predict dependent values from multi-dimensional covariate inputs, where the number of dimensions of the input is much less than the number of dimensions informing the dependent value, i.e., the input is of a "reduced order". Dependent values predicted by the surrogate model, while accurate, may still be less accurate than those obtained from a full model.

SUMMARY

Machine learning techniques are frequently used to generate models via training with exemplary data (i.e., training data sets). Techniques to convert this exemplary data into models include linear regression, logistic regression, decision tree learning, support vector machines, k-nearest neighbor algorithms, artificial neural networks, and others. In each of these examples, the final model is typically expressed in a serializable fashion that facilitates subsequent loading and testing against data other than that used for training (i.e., "holdout data sets"). Except in a few cases (e.g., linear regression models and decision tree learning without ensembles), these models are considered all but inscrutable to human beings. Such models are described as "opaque". Even where the output can be expressed in a way that is readable by a human (e.g., in the case of a decision tree), the model may be very complex if the input data contains many covariates. As a result, the model may not be easily explainable or understandable to a human mind, if at all.

The present embodiments advantageously generate reduced-order surrogate models in human-readable formats that are "transparent" (i.e., not opaque) and do not require specialized knowledge outside of the domain being described by the model itself. For example, a person trained in a particular field (e.g., physics, engineering, social sciences, etc.) will be able to immediately understand a reduced-order surrogate model generated by the present embodiments in the same field. With this transparency, the trained person will then be able to validate the reduced-order surrogate model using standard techniques.

Another disadvantage of prior-art machine-language techniques is that even when the resulting models are transparent, they are only useful as predictors when they are expressed in a serializable fashion within some technology context. For example, decision trees can be read when printed on paper, but the printed version is not what is exchanged between the training and predicting phases of the prior art.

The present embodiments advantageously generate reduced-order surrogate models that are expressed as mathematical equations that can be loaded into another system that can parse the mathematical expressions. For example, an equation produced by one of the present embodiments can be directly copied and pasted into another program for validation or prediction. Two demonstrations of these advantages are presented. In the first, a reduced-order surrogate model is generated for breast cancer data. In the second, a reduced-order surrogate model generated for a synthetic data set exactly recovers the equation used to generate the synthetic data. In both demonstrations, the reduced-order surrogate model is simply copied and pasted into a spreadsheet for validation against hold-out data.

Models of all kinds are often subject to overfitting. Although simpler models, such as those generated by linear regression, are less subject to overfitting than most, the issue still occurs in most machine-learning techniques. With the present embodiments, the resulting transparent reduced-order surrogate models are capable of analysis using traditional functional methodologies. Furthermore, covariates that have an impact on the prediction can be outputted, helping to prevent and/or minimize overfitting in a clearly understood and analyzed post-hoc methodology.

In the following discussion, the terms "chromosome", "gene", "mutation", "parent", "offspring", and the like should be recognized by those trained in the art as referring to their usage in the fields of computer science and operations research, specifically evolutionary algorithms and numerical optimization. While the use of these terms herein clarifies connections between the present embodiments and biological chromosomes, it should be understood that the scope of these terms excludes any such biological matter.

In embodiments, a method for generating a reduced-order surrogate model that approximates a data set includes determining, for each parent chromosome of a population of parent chromosomes, a fitness value by applying the data set to a chromosome function constructed from a sequence of genes of said each parent chromosome. The method also includes randomly assigning each parent chromosome into one of a first subpopulation of parent chromosomes and a second subpopulation of parent chromosomes, and ordering the first subpopulation of parent chromosomes based on their fitness values. The method also includes generating a population of child chromosomes by iteratively: (i) randomly selecting, from the first subpopulation, a first parent chromosome having a fitness value within an upper echelon of the fitness values of the parent chromosomes of the first subpopulation, (ii) randomly selecting a second parent chromosome from the second subpopulation, and (iii) constructing a child chromosome of the population of child chromosomes by randomly selecting, for each gene of the first parent chromosome, a child gene equal to either said each gene of the first parent chromosome or a corresponding gene of the second parent chromosome. The reduced-order surrogate model is represented by a fittest chromosome function constructed from a fittest child chromosome having a highest fitness value of the population of child chromosomes.

In other embodiments, a system for generating a reduced-order surrogate model that approximates a data set includes a processor and a secondary storage device communicably coupled with the processor and configured to store the data set. The system also includes a memory communicably coupled with the processor and storing machine-readable instructions that, when executed by the processor, control the system to determine, for each parent chromosome of a population of parent chromosomes, a fitness value by applying the data set to a chromosome function constructed from a sequence of genes of said each parent chromosome. The machine-readable instructions also control the system to randomly assign each parent chromosome into one of a first subpopulation of parent chromosomes and a second subpopulation of parent chromosomes. The machine-readable instructions also control the system to randomly assign each parent chromosome into one of a first subpopulation of parent chromosomes and a second subpopulation of parent chromosomes, and to order the first subpopulation of parent chromosomes based on their fitness values. The machine-readable instructions also control the system to generate a population of child chromosomes by iteratively (i) randomly selecting, from the first subpopulation, a first parent chromosome whose fitness value is within an upper echelon of the fitness values of the parent chromosomes of the first subpopulation, (ii) randomly selecting a second parent chromosome from the second subpopulation, and (iii) constructing a child chromosome of the population of child chromosomes by randomly selecting, for each gene of the first parent chromosome, a child gene equal to either said each gene of the first parent chromosome or a corresponding gene of the second parent chromosome.

BRIEF DESCRIPTION OF THE FIGURES

FIG. 12 shows the output of computer code while generating a reduced-order surrogate model for a breast-cancer data set.

FIG. 13 shows a spreadsheet used to verify the reduced-order surrogate model of FIG. 12.

FIG. 14 shows the output of computer code while generating a reduced-order surrogate model for a synthetic data set.

FIG. 15 shows a spreadsheet used to verify the reduced-order surrogate model of FIG. 14.

DETAILED DESCRIPTION

Figure 1:
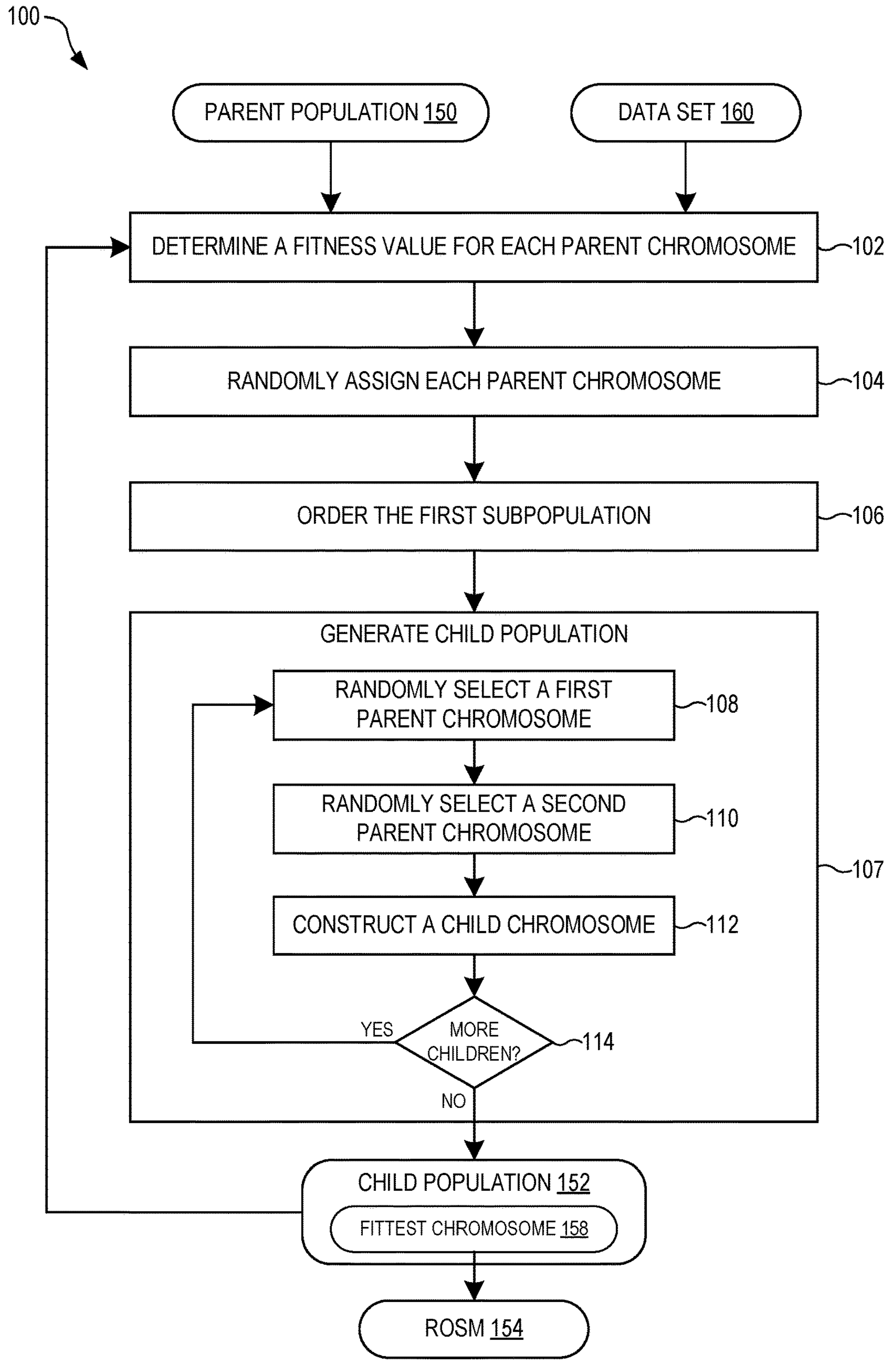
FIG. 1 is a flow chart of a method for generating a reduced-order surrogate model that approximates a given data set, in embodiments.

FIG. 1 is a flow chart of a method 100 for generating a reduced-order surrogate model that approximates a given data set. The method 100 is based on genetic algorithms that randomly search a solution space to identify an optimal solution. In this case, the reduced-order surrogate model generated by the method 100 is the optimal solution, i.e., the one mathematical formula of a plurality of candidate formulas that best approximates the data set. Ideally, the optimal solution represents, to within a specified tolerance or accuracy level, the global optimum (i.e., maximum or minimum) of the solution space, as opposed to a local optimum that may be different from the global optimum. Accordingly, the method 100 may use any one or more of a number of techniques that randomize the candidate formulas, thereby increasing the likelihood that the candidate formulas sample the solution space with a sufficient density to find the global optimum. More details on these randomization techniques are explained below.

The method 100 begins with a parent population 150 of chromosomes, each formed from a sequence of genes that collectively represent a corresponding chromosome function that takes one or more parameters as input. All of the chromosomes of the parent population 150 are assumed to have the same positive integer number of genes. For clarity in the following discussion, it is assumed that each chromosome function is a scalar-valued mathematical function that returns a single value. However, the method 100 can also operate with each chromosome function being a vector-valued mathematical function that return multiple values. More details about the structure of the chromosomes and genes is discussed below under “Chromosome Structure”.

In the block 102 of the method 100, a fitness value is determined for each parent chromosome of the parent population 150. Specifically, a fitness function evaluates a parent chromosome's corresponding chromosome function with labeled data points taken from an inputted data set 160. Since the data points in the data set 160 are labeled, the method 100 is an example of a supervised learning algorithm. More details about the fitness function, its use with the inputted data set 160, and the structure of the inputted data set 160 is discussed below under “Determining the Fitness of a Chromosome”.

In the block 104 of the method 100, each parent chromosome of the parent population 150 is randomly assigned to either a first subpopulation of parent chromosomes or a second subpopulation of parent chromosomes. In the block 106, the first subpopulation of parent chromosomes is ordered based on their fitness values. For example, the first subpopulation of parent chromosomes may be sorted in descending order of fitness values. An upper echelon of the ordered first subpopulation may then be defined as a subset of the first subpopulation with the largest fitness values, i.e., the chromosomes in the upper echelon are the “most fit” of the first subpopulation. For example, the upper echelon may consist of those chromosomes of the first subpopulation whose fitness values are within the top third of all the fitness values of the first subpopulation. More details about the blocks 104 and 106 can be found below under “Randomly Assigning and Sorting the Parent Chromosomes”.

The method 100 includes the block 107 in which a child population 152 of child chromosomes is generated. The block 107 iterates over subblocks 108, 110, and 112, with each iteration generating one child chromosome for the child population 152. In the subblock 108, a first parent chromosome is randomly selected from the upper echelon of the first subpopulation. For example, the first parent chromosome may be randomly selected from the upper echelon using weighted roulette-wheel selection with replacement. In the subblock 110, a second parent chromosome is randomly selected from the second subpopulation. For example, the second parent chromosome may be randomly selected from the second subpopulation using weighted roulette-wheel selection with replacement. Note that an upper echelon is not needed for randomly selecting the second parent chromosome from the second subpopulation. More details about the subblocks 108 and 110 is discussed below under "Selecting Parent Chromosomes".

In the subblock 112, a child chromosome is constructed from the first and second parent chromosomes. Specifically, for each gene of the first parent chromosome, a corresponding child gene is randomly chosen to equal either the said each gene of the first parent chromosome or the corresponding gene of the second parent chromosome. The child chromosome will have the same number of genes as each of the first and second parent chromosomes. The resulting child chromosome is then added to the child population 152. More details about the subblock 112 is discussed below under "Generating a Child Chromosome".

Although not shown in FIG. 1, a child gene may be mutated in the subblock 112 prior to being added to the child chromosome, thereby adding another source of randomization. More details about gene mutation is discussed below under "Gene Mutation".

In the decision block 114, a size of the child population 152 (i.e., the number of chromosomes in the child population 152) is compared to a predetermined number (e.g., 128). If the size of the child population 152 is less than the predetermined number, then the block 107 returns to the subblock 108 to generate another child chromosome. The block 107 continues iterating until the size of the child population 152 equals or exceeds the predetermined number.

After the child population 152 is fully constructed, a fitness value may be determined for each child chromosome. A fittest chromosome 158 is the one chromosome of the child population 152 with the highest fitness value, and therefore best represents the data set 160. The genes of the fittest chromosome 158 can be parsed (e.g., see FIGS. 3A-3C below) to determine the corresponding chromosome function, which is then outputted as a reduced-order surrogate model (ROSM) 154. The ROSM 154 may be a text string representing the chromosome function as an analytic equation. Alternatively, the ROSM 154 may be represented as machine-readable instructions (i.e., software or computer code) that, when executed by a computer processor, controls the computer processor to evaluate the chromosome function with given input parameters.

Alternatively, the method 100 may return to the block 102, using the child population 154 as the parent population 150 for the next iteration. Each iteration of the method 100 is also referred to herein as a "generation". Accordingly, in the first iteration of the method 100, the parent population 150 is used to create a first-generation child population 152. In a second iteration of the method 100, the first-generation child population 152 is used to create a second-generation child population 152. After n iterations of the method 100, an $n^{th}$-generation child population 152 is created.

The fitness values of the fittest chromosome 158 may be tracked across generations to determine if the method 100 is converging (i.e., if the fitness value of the fittest chromosome 158 is converging). If so, the chromosome function of the most-recent fittest chromosome 158 may be outputted as the ROSM 154 and the method 100 stops. Alternatively, tracking of the fittest chromosome 158 may be used to determine if the method 100 is not converging. For example, the method 100 may be "stuck" or "stagnated" in a local optimum and needs to sample more points in the solution space to find a more optimal solution. In this case, techniques can be used with the method 100 to introduce more randomization to help find the optimal solution. More details on these randomization techniques are provided below.

When tracking of the fittest chromosome 158 is used with the method 100, then the fitness values of the child population 152 can be determined at the end of each iteration. In this case, each new generation of the method 100 can begin with the block 104 instead of the block 102. However, if tracking of the fittest chromosome 158 is not used, then there may be no need to determine the fitness values of the child population 152 at the end of each iteration. In this case, each new generation of the method 100 can begin with the block 102, as shown in FIG. 1.

Chromosome Structure

Figure 2:
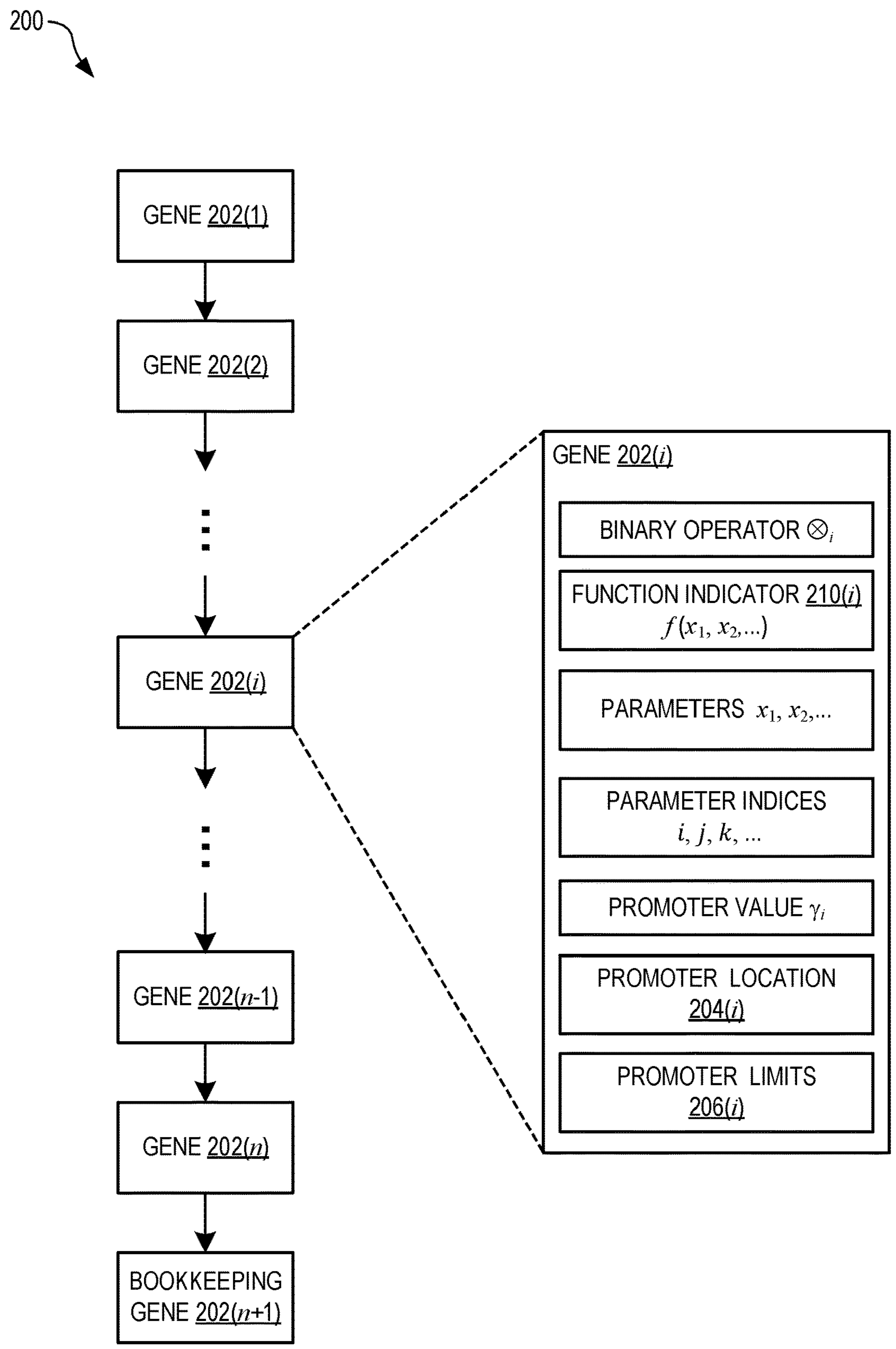
FIG. 2 is a functional diagram of a chromosome formed from a sequence of linked genes, in an embodiment.

FIG. 2 is a functional diagram of a chromosome 200 formed from a sequence of n linked genes 202. The chromosome 200 is one example of how a mathematical equation may be represented for use with a genetic algorithm to, for example, identify a reduced-order surrogate model that best represents a multivariate data set (see FIG. 5). The number n of genes in the chromosome 200 may be any non-zero integer selected such that the represented mathematical equation has enough parameters to well-approximate the multivariate data set. The chromosome 200 may additionally contain a bookkeeping gene 202(*n*+1) whose functionality is described in more detail below. The chromosome 200, and each of the n linked genes 202 therein, may be implemented as a data structure on a computer (e.g., see FIG. 11).

As shown in FIG. 2, each gene 202(*i*) (where i runs from 1 to n) stores a binary operator $\otimes_i$ selected from a predetermined set $S_\otimes$ of binary operators. Examples of binary operators that may be included in the set $S_\otimes$ include the four basic arithmetic operations of addition (+), subtraction (−), multiplication (×), and division (/). The set $S_\otimes$ of binary operators may additionally or alternatively include div (i.e., division without a remainder), modulo (i.e., division without a quotient), and logical binary operators (e.g., AND, OR, NAND, XOR, etc.). The set $S_\otimes$ of binary operators may include additional or alternative binary operators without departing from the scope hereof. Composition of functions, which is also a binary operation, will be considered separately, as described below.

Each gene 202(*i*) also stores a function indicator 210(*i*) that identifies one mathematical primitive $f$ from a predetermined set $S_f$ of mathematical primitives. Each mathematical primitive $f$ in the set $S_f$ is a function that may receive as input one or more parameters $x_1$, $x_2$, . . . , etc. A mathematical primitive $f$ in the set $S_f$ may be a single-parameter function that receives only one function parameter, i.e., $f(x_1)$. Alternatively, a mathematical primitive in the set $S_f$ may be a multi-parameter function that receives two or more function parameters, i.e., $f(x_1, x_2, \ldots)$. Examples of mathematical primitives include absolute value, trigonometric functions (e.g., sin, cos, tan, arcsin, etc.), hyperbolic functions (e.g., sinh, tanh, etc.), square root, exponentiation, logical truth functions, and the like. Note that a mathematical primitive may also be a two-parameter function $f(x_1, x_2)$ that can implement one of the binary operations described above. For example, exponentiation of a base with an exponent may be implemented as a binary exponentiation operator in the set $S_\otimes$, or as a two-parameter exponentiation primitive in the set $S_f$.

Each gene 202(*i*) also stores a promoter value $\gamma_i$ and a promoter location 204(*i*) that identifies either (i) which of the one or more parameters x the promoter value $\gamma_i$ scales, or (ii) that the promoter value $\gamma_i$ scales an output of the mathematical primitive $f$ identified by the function indicator 210(*i*). Thus, the promoter value $\gamma_i$ is a number (e.g., a real number) that multiplies, based on the promoter location 204(*i*), either (i) one of the parameters x prior to evaluation of the mathematical primitive $f$, or (ii) the result of the evaluation of the mathematical primitive $f$. While FIG. 1 shows each gene 202(*i*) storing only a single promoter value $\gamma_i$, each gene 202(*i*) may store an additional promoter value for each parameter x (i.e., when the mathematical primitive $f$ takes more than one parameter x) and the result $y_i$. Each gene 202(*i*) may also store one or more promoter limits 206(*i*) that define a range of values over which the promoter value $\gamma_i$ may be varied (e.g., during mutation, as described in more detail below). The promoter limits 206(*i*) may be used, for example, when a quantity (i.e., the promoter value $\gamma_i$, a promoter-scaled function parameter $\gamma_i x$, or a promoter-scaled result $\gamma_i y_i$) has a physical interpretation that imposes constraints on what values for the quantity are acceptable.

Figure 3A:
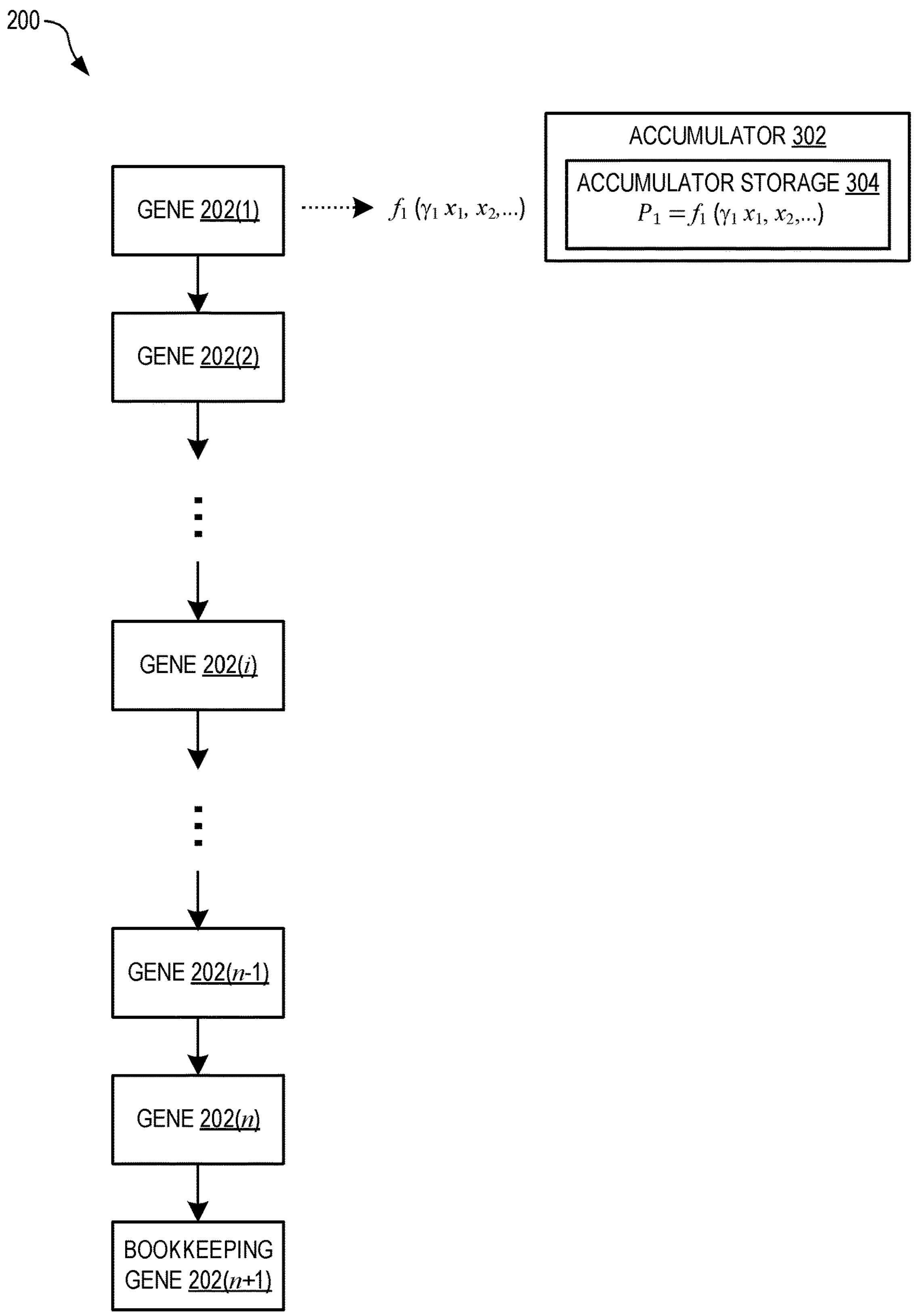
FIG. 3A shows an accumulator extracting a first function indicator from a first gene of the chromosome of FIG. 2, in embodiments.
Figure 3B:
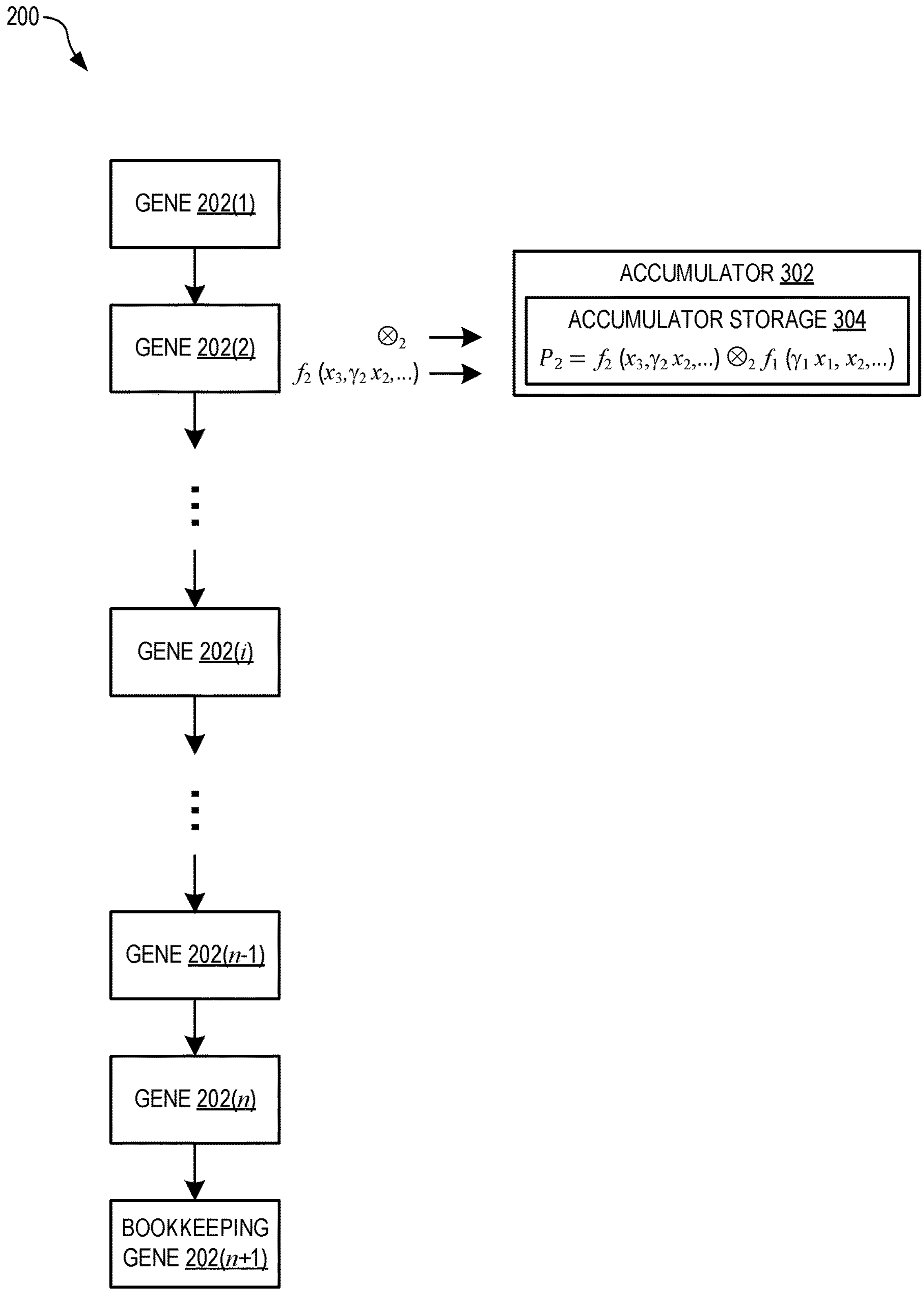
FIG. 3B shows the accumulator of FIG. 3A extracting a second function indicator and a binary operator from a second gene of the chromosome of FIG. 2, in embodiments.
Figure 3C:
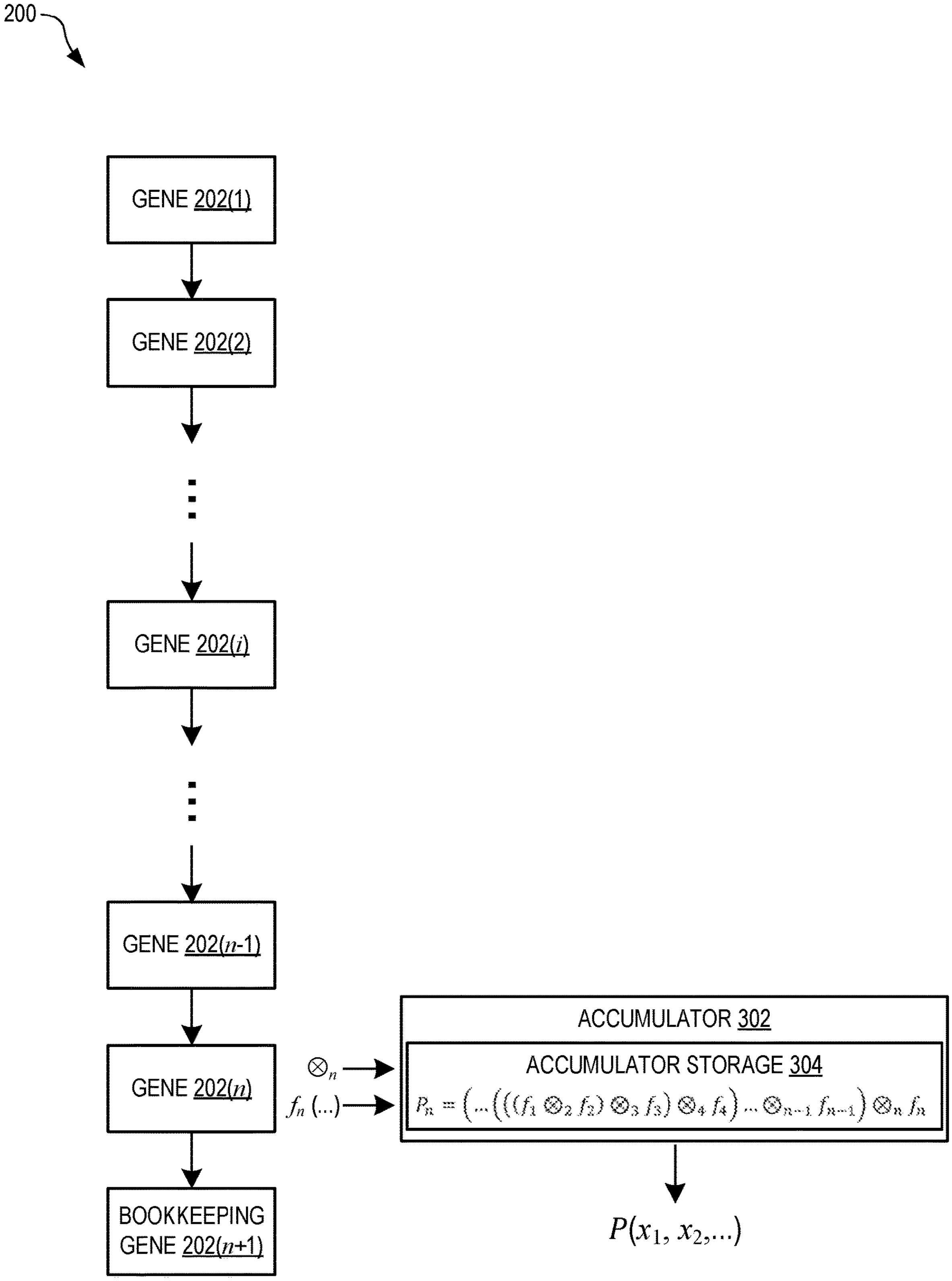
FIG. 3C shows the accumulator of FIGS. 3A and 3B outputting a chromosome function of the chromosome of FIG. 2, in embodiments.

FIGS. 3A-3C illustrate a computer-implemented method for determining a chromosome function P of the chromosome 200 of FIG. 2. An accumulator 302 steps sequentially through the genes 202, starting at the first gene 202(1) and ending at the last gene 202(*n*). The accumulator 302 may also access the bookkeeping gene 202(*n*+1), when present. The accumulator 302 extracts from the first gene 202(1) the first function indicator 210(1), the number and type of the corresponding parameters $(x_1, x_2, \ldots)$, the first promoter value $\gamma_1$, and the first promoter location 204(1). From this extracted information, the accumulator 302 constructs a first analytic expression $f_1(\gamma_1 x_1, x_2, \ldots)$ representing the first gene 202(1). The first promoter value γ1 is included in the first analytic expression $f_1(\gamma_1 x_1, x_2, \ldots)$ as the numerical value stored in the gene 202(1), as opposed to a named variable that can take on a variety of values. The accumulator 302 stores the first analytic expression $f_1(\gamma_1 x_1, x_2, \ldots)$ as a first partial function $P_1 = f_1(\gamma_1 x_1, x_2, \ldots)$ in an accumulator storage 304.

The accumulator 302 stores the first partial function $P_1$ in a machine-readable representation (i.e., computer code) that can be subsequently evaluated (e.g., via execution with a processor, see FIG. 11) to obtain a numerical result. When $P_1$ is numerically evaluated, only values for the parameters x will need to be retrieved and passed to the mathematical primitive $f_1$. While FIG. 3A shows the first promoter value $\gamma_1$ scaling a parameter $x_1$, the first promoter value $\gamma_1$ may alternatively scale another parameter x, if present, or the result of the mathematical primitive $f_1$ (i.e., $P_1 = \gamma_1 f_1(x_1, x_2, \ldots)$). Any binary operator $\otimes_1$ stored in the first gene 202(1) is ignored.

In FIG. 3B, the accumulator 302 extracts from the second gene 202(2) the second function indicator 210(2), the number and type of the corresponding parameters $(x_1, x_2, \ldots)$, the second promoter value $\gamma_2$, the second promoter location 204(2), and the second binary operator $\otimes_2$. From this extracted information, the accumulator 302 constructs a second analytic expression $f_2(x_3, \gamma_1 x_4, \ldots)$ representing the second gene 202(2). The accumulator 302 combines the second analytic expression $f_2(x_3, \gamma_1 x_4, \ldots)$ with the first partial function $P_1$ according to the second binary operator $\otimes_2$, and stores the result in the accumulator storage 304 as a second partial function $P_2$ represented analytically as $P_2 = f_1(\gamma_1 x_1, x_2, \ldots) \otimes_2 f_2(x_3, \gamma_2 x_4, \ldots)$. Like the first partial function $P_1$, the second partial function $P_2$ is stored in a machine-readable representation that can be numerically evaluated. While FIG. 3B shows the second promoter value $\gamma_2$ scaling a function parameter $x_4$, the second promoter value $\gamma_2$ may alternatively scale another parameter x (if present) or the result of the mathematical primitive $f_2$ (i.e., $P_2 = f_1(\gamma_1 x_1, x_2, \ldots) \otimes_2 (\gamma_2 f_2(x_3, x_4, \ldots))$.

The accumulator 302 continues to generate a new partial function $P_i$ by combining the analytic expression of each gene 202(*i*) with the immediately previous partial function $P_{i-1}$ stored in the accumulator storage 304. As shown in FIG. 3C, after the last gene 202(*n*), the last partial function $P_n$ is mathematically equivalent to $$P_n = ( \ldots (((f_1 \otimes_2 f_2) \otimes_3 f_3) \otimes_4 f_4) \ldots \otimes_{n-1} f_{n-1}) \otimes_n f_n. \quad (1)$$

For clarity in Eqn. 1, the promoter values γ and parameters x have been left out. The last partial function $P_n$ is the chromosome function P representing the entire chromosome 200. The chromosome function P is in a machine-readable representation that can be numerically evaluated to obtain a numerical result $y_i$. As shown in FIG. 3C, the chromosome function P may also be written $P(x_1, x_2, \ldots)$ to indicate that it is unevaluated, requiring an input value for each of the parameters x to be evaluated. The parameters passed to the chromosome function P include all of the parameters x stored in all of the genes 202.

Figure 4:
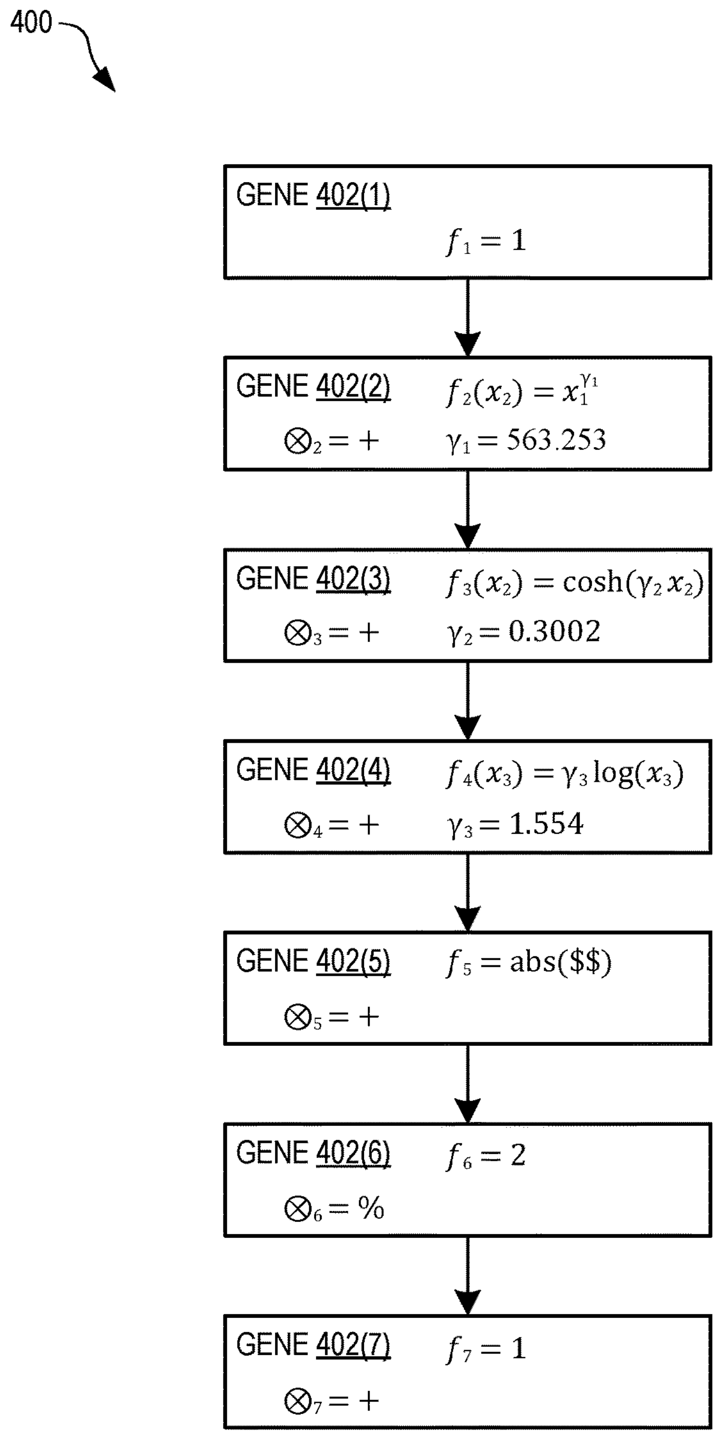
FIG. 4 shows an example of the method illustrated in FIGS. 3A-3C.

FIG. 4 shows an example of the method illustrated in FIGS. 3A-3C. Here, a chromosome 400 with seven genes 402 has a chromosome function $$P(x_1, x_2, x_3) = \left(\mathrm{abs}\left(1 + x_1^{563.253} + \cosh(0.3002 x_2) + 1.554\log(x_3)\right)\%2\right) + 1. \quad (2)$$

For clarity in FIG. 4, each promoter value $\gamma_i$ is already shown in the corresponding mathematical primitive $f_i$ at the promoter location 204(*i*). The first gene 402(1) does not store a first binary operator $\otimes_1$, similar to the first gene 202(1) of the chromosome 200.

The chromosome 400 contains genes 402(2), 402(3), and 402(5) that are similar to the genes 202 of FIG. 1. However, the chromosome 400 also contains genes 402(1), 402(6), and 402(7) in which the corresponding mathematical primitive $f_i$ is a constant. Accordingly, each of these genes, also referred to as a c-gene, contains no parameters x, promoter value γ, and promoter location 204. Like the genes 202 of FIG. 2, each c-gene may also store a binary operator ⊗. Since c-genes do not store promoter values γ, they do not change during mutation. The chromosome 200 may include one or more c-genes without departing from the scope hereof.

In FIG. 4, the fifth gene 402(5) has a fifth mathematical primitive $f_5$=abs($$), where $$ is an accumulator-reference symbol indicating that the most recent expression stored in the accumulator storage 304 should be passed to the mathematical primitive as a parameter. While the fifth gene 402(5) shows the use of the accumulator-reference symbol \$\$ with a single-variable function (i.e., the absolute value function), the accumulator-reference symbol \$\$ may also be used in lieu of any function parameter x in any multi-variable mathematical primitive $f_i$. Furthermore, the fifth mathematical primitive $f_5$ of the fifth gene 402(5) contains no promoter value $\gamma$ that can change during mutation. Accordingly, any gene 202 of the chromosome 200 can be configured without a promoter value $\gamma$.

Although not shown in FIG. 4, the chromosome 400 may also be configured with a bookkeeping gene that is similar to the bookkeeping gene 202($n$+1) of FIG. 1. One use of the bookkeeping gene 202($n$+1) is to store n switches that activate/deactivate each of the previous n genes 202. Activation of genes may be controlled manually, or changed randomly during mutation. As an example, deactivation of the genes 402(3), 402(5), and 402(7) in the chromosome 400 yields the chromosome function $$P(x_1, x_2) = \left(1 + x_1^{563.253} + 1.554\log(x_2)\right)\%2.$$

The bookkeeping gene 202($n$+1) may also be used to implement a variable offset to be added to the chromosome function P. This is equivalent to appending to the chromosome 200 a gene 202($n$+1) with a single promoter value $\gamma_{n+1}$ and a function indictor 210($n$+1) and promoter location 204($n$+1) identifying the mathematical primitive $f_{n+1}=\gamma_{n+1}$. A deactivated gene is also referred to as a dormant gene.

Determining the Fitness of a Chromosome

In embodiments, a fitness function F is used to quantify how well a chromosome (i.e., the chromosome function P) models a data set. The fitness function F may receive the chromosome 200 as an input and return a single number v that is referred to as a fitness value. In embodiments, the fitness function F may alternatively be a cost function or loss function.

Figure 5:
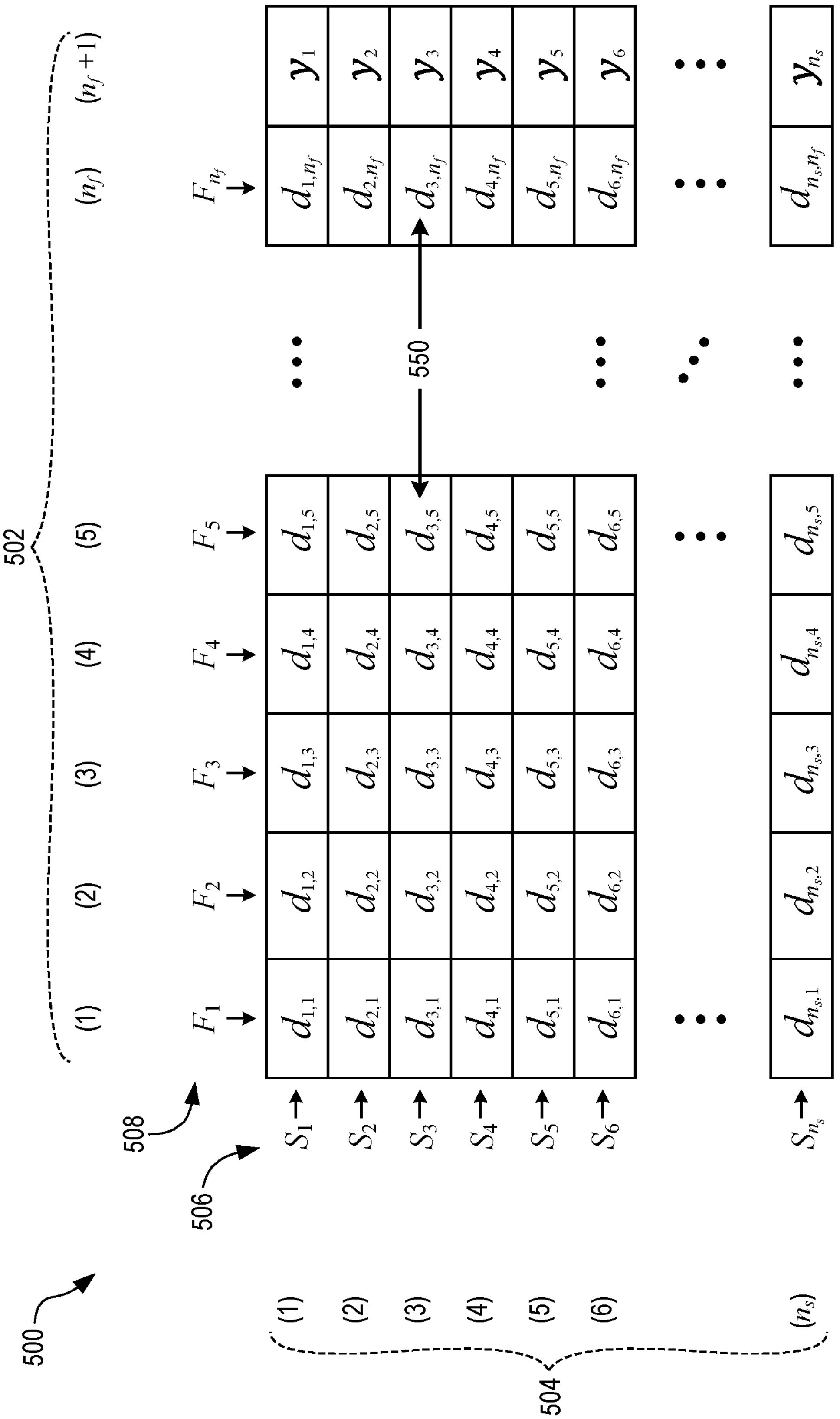
FIG. 5 shows a data set with which the present embodiments may be used.

FIG. 5 shows a data set with which the present embodiments may be used to generate a reduced-order surrogate model. In FIG. 5, the data set is a matrix 500 storing data points 510 organized into $n_f$ columns 502 and $n_s$ rows 504. The symbol $d_{i,j}$ denotes the data point 510 in the $i^{th}$ row and $j^{th}$ column. Each row 504 corresponds to one of $n_s$ samples 506, which are labeled $S_1, S_2, \ldots, S_{n_s}$. Each column 506 corresponds to one of $n_f$ features 508, which are labeled $F_1, F_2, \ldots, F_{n_f}$. One of the columns 502, shown in FIG. 5 as a last column 502($n_f$+1), contains target values $y_i$, i.e., each sample $S_i$ has a single corresponding target value $y_i$. However, each of the samples 506 may have more than one target value y without departing from the scope hereof.

To facilitate the use of the fitness function F with the matrix 500, a parameter x in a gene 202 may be obtained via a parameter index that references a column 502 of the matrix 500 (see parameter indices i, j, k, . . . in FIG. 2). Each parameter index indicates that the value of the parameter x should be obtained from the referenced column. When each parameter x is associated with a corresponding index, a gene 202 may store a number of parameter indices equal to the number of parameters x passed to the mathematical primitive $f_i$. Alternatively, the number of parameter indices may be less than the number of parameters x, such as when one index is used with more than one parameter x, or when the accumulator-reference symbol is used in lieu of a parameter x.

Figure 6:
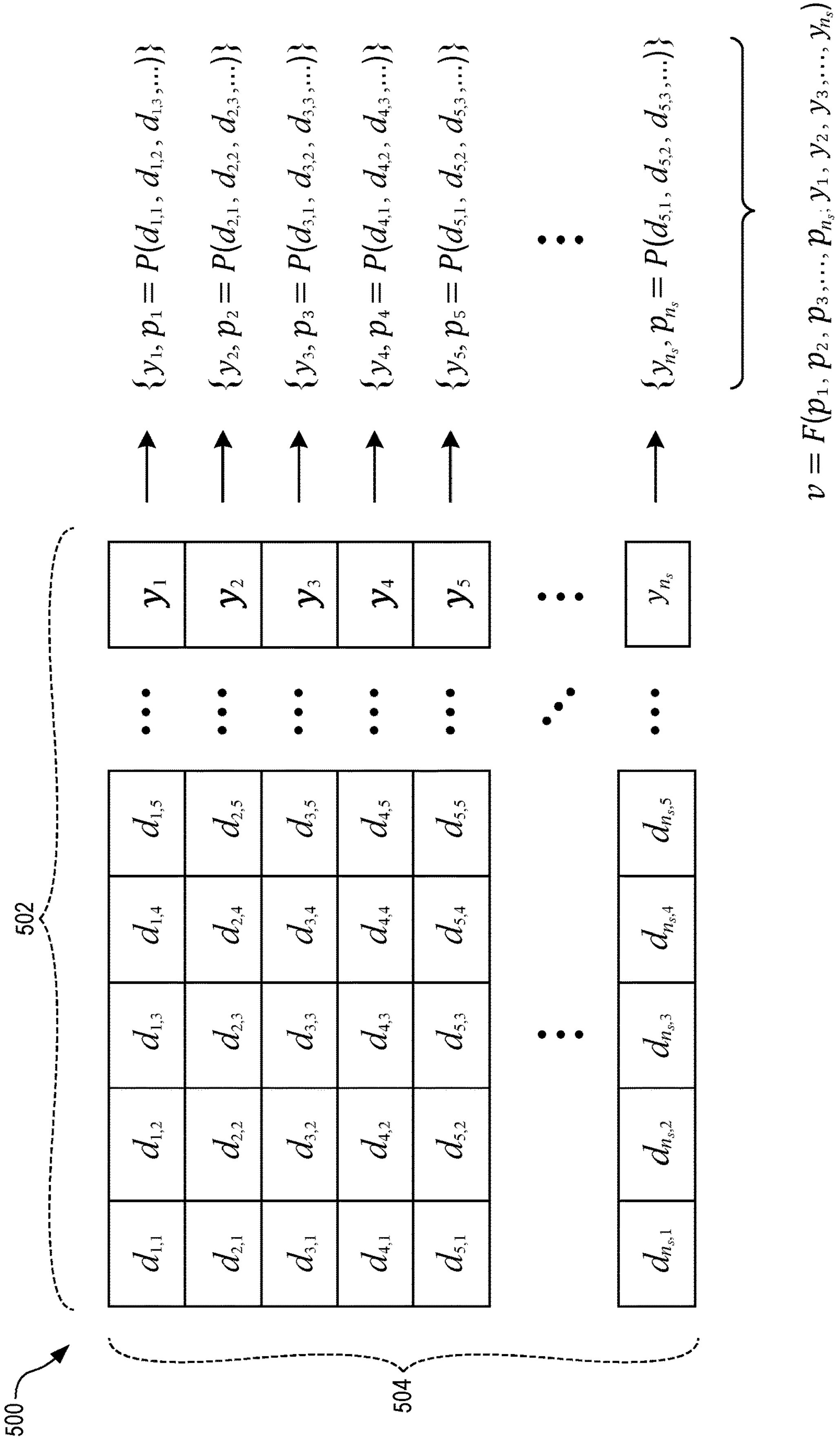
FIG. 6 illustrates a method for determining a fitness value for the chromosome of FIG. 2 with respect to the data set of FIG. 5, in embodiments.

FIG. 6 illustrates a method for determining the fitness value v for the chromosome 200 with respect to the matrix 500. The chromosome function P obtained from the chromosome 200 is evaluated using the data points 510 for each row 504($i$) as the corresponding parameters x. For each row, the evaluation of P returns a corresponding predicted value $p_i=P(d_{i,1}, d_{i,2}, d_{i,3}, \ldots)$. For each parameter of P, the parameter index determines which of the data points 510 of the corresponding row 504($i$) is passed to P as said each parameter. The fitness function F compares each predicted value $p_i$ with the corresponding target value $y_i$ to determine a contribution from the row 504($i$). For example, each row 504($i$) may contribute the value $(p_i-y_i)^2$ to the fitness value. In this case, when these contributions are summed for all of the rows 504, the fitness value v equals the $\chi^2$ test statistic. However, the fitness function F may implement a different type of test statistic or fitness value without departing from the scope hereof. In general, the fitness function F is a function of all $n_s$ predicted values $p_i$ and the corresponding $n_s$ target values $y_i$, i.e., $v=F(p_1, p_2, \ldots, p_{n_s}; y_1, y_2, \ldots, y_{n_s})$.

Randomly Assigning and Sorting the Parent Chromosomes

Figure 7:
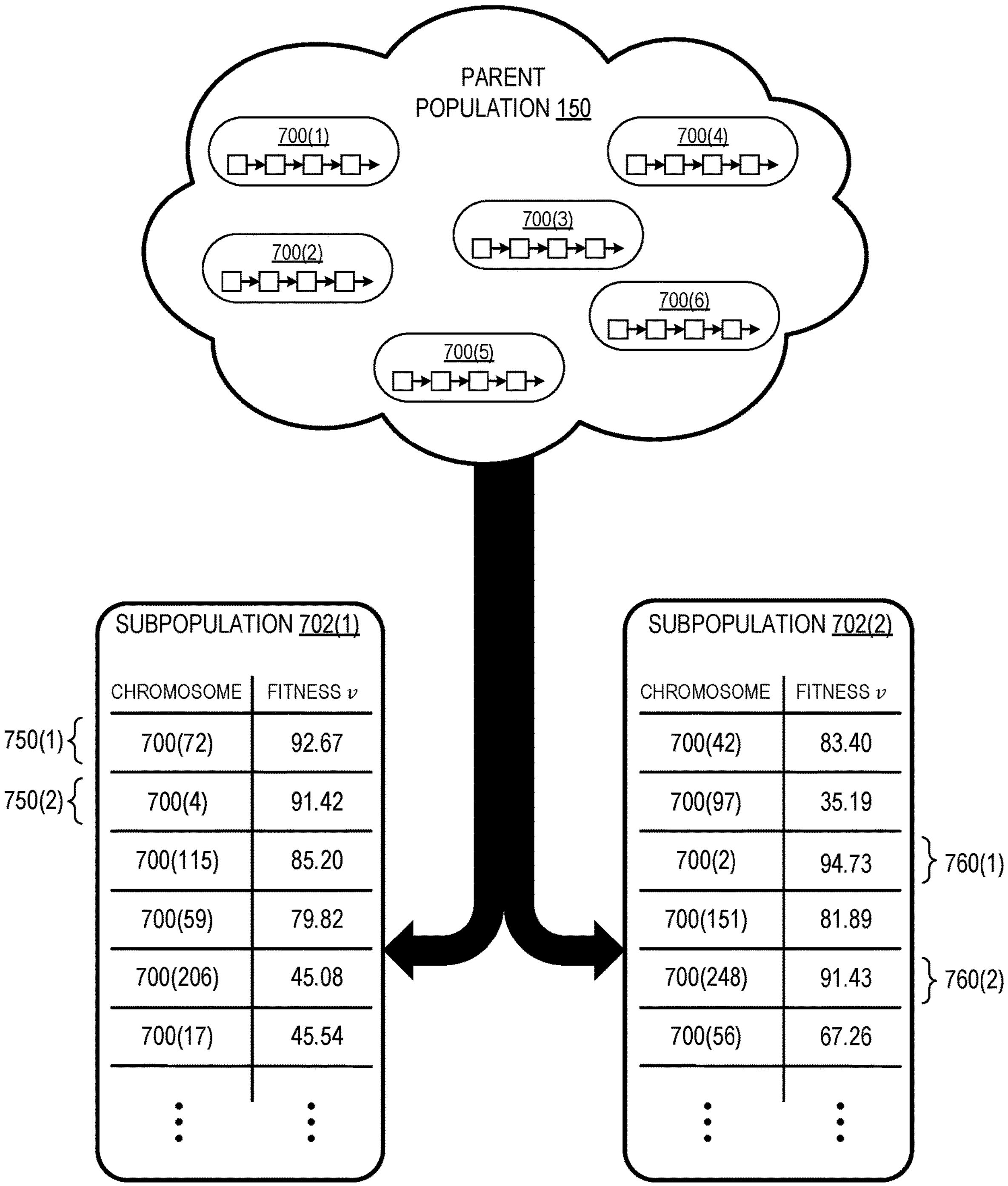
FIG. 7 illustrates a method for randomly assigning each of a parent population of parent chromosomes into either a first subpopulation or a second subpopulation, in an embodiment.

FIG. 7 illustrates a method for randomly assigning each of the parent population 150 of parent chromosomes 700 into either a first subpopulation 702(2) or a second subpopulation 702(2). Each of the parent chromosomes 700 is similar to the chromosome 200 described above, and has a corresponding chromosome function P. While FIG. 7 shows the parent population 150 with six parent chromosomes 700, the parent population 150 may contain hundreds or thousands of parent chromosomes 700, or more. Where the parent chromosomes 700 are randomly constructed, it is likely that each of the parent chromosomes 700 has a unique chromosome function P. However, due to the randomness, it is not guaranteed that all of the chromosome functions P in the parent population 150 are unique.

Either before or after each parent chromosome 700 is randomly assigned to the first subpopulation 702(1) or the second subpopulation 702(2), the fitness function is called for each of the chromosomes 700 to obtain a corresponding fitness value v with respect to a data set (e.g., the matrix 500). The chromosomes 700 of the first subpopulation 702(1) are then ranked according to their fitness values v to identify the "most fit" chromosomes 700 within each subpopulation 702. Thus, the chromosomes 700 of the second subpopulation 702(2) do not need to be ranked.

In FIG. 7, the chromosomes 700 within each subpopulation 702 are identified according to their index value in parentheses. The chromosomes 700 of the first subpopulation 702(1) are ranked in decreasing order of their fitness values v. In this case, the chromosomes 700 with the largest fitness values v are the most fit. However, the fitness function F may be a loss or cost function such that smaller fitness values v correspond to more fit chromosomes. In this case, the chromosomes 700 can be ranked in decreasing order of fitness values v to identify those that are the most fit.

Selecting Parent Chromosomes

Figure 8:
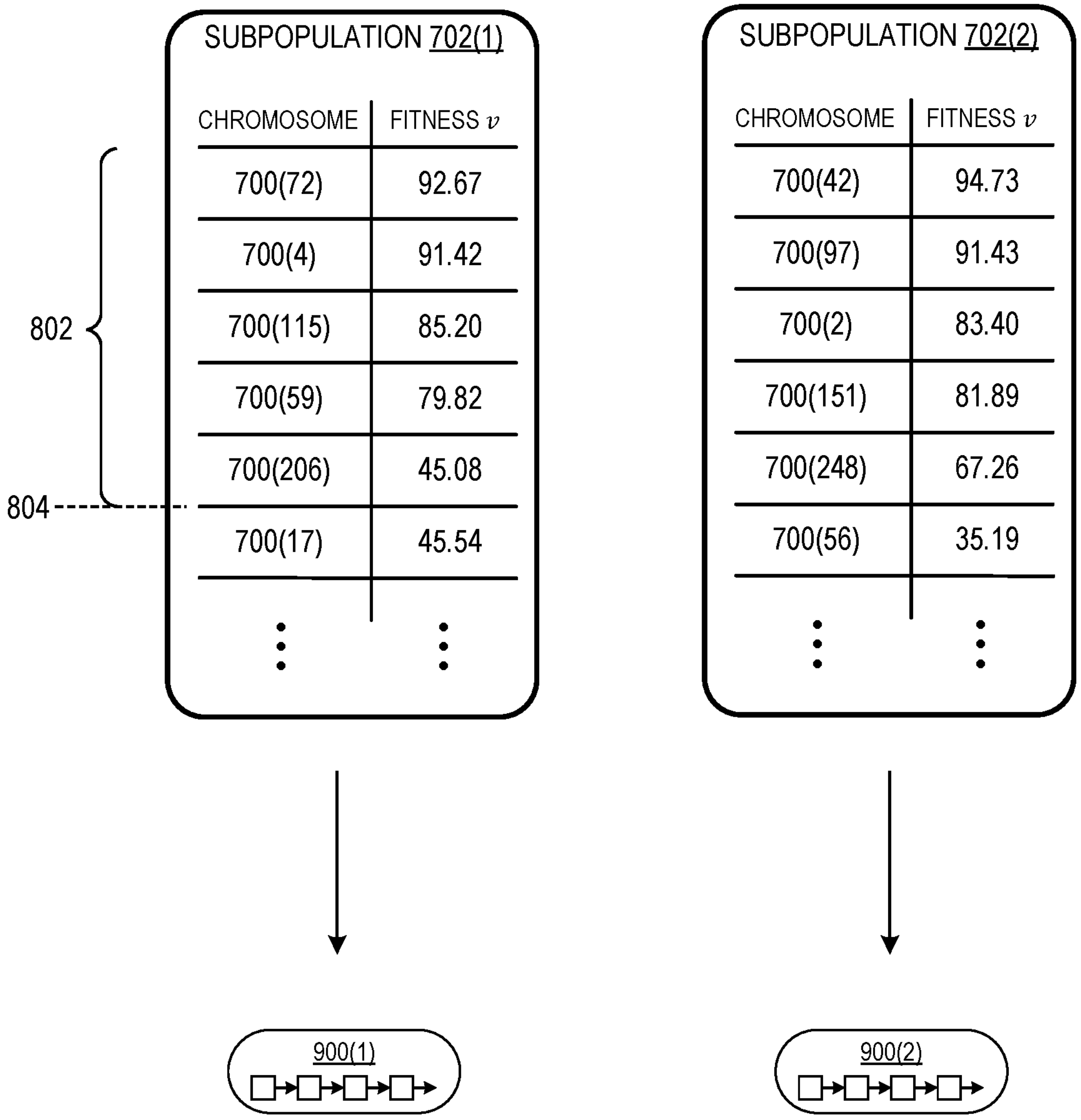
FIG. 8 illustrates a method for randomly selecting a first parent chromosome from the first subpopulation of FIG. 7, and for randomly selecting a second parent chromosome from the second subpopulation of FIG. 7, in an embodiment.

FIG. 8 illustrates a method for randomly selecting a first parent chromosome 900(1) from the first subpopulation 702(1), and for randomly selecting the second parent chromosome 900(2) from the second subpopulation 702(2). The first parent chromosome 900(1) may be randomly selected from an upper echelon 802 of the first subpopulation 702(1), where the upper echelon 802 is the subset of the first subpopulation 702(1) with the largest fitness values v. A chromosome 700 in the first subpopulation 702(1) is in the upper echelon 802 if its fitness value v is above a cutoff 804 determined from the fitness values v of the first subpopulation 702(1). For example, the cutoff 804 may be selected to be one-third of the number of chromosomes 700 in the first subpopulation 702(1) such that each chromosome 700 in the upper echelon 802 has a fitness value v within the top one-third of all of fitness values v of the first subpopulation 702(1). Alternatively, the cutoff 804 may be selected such that the upper echelon 802 represents the top half, or the top quarter, of the fitness values v of the first subpopulation 702(1). The cutoff 804 may be selected in another way without departing from the scope hereof. Alternatively, the cutoff 804 may be excluded, wherein all of the chromosomes 700 of the first subpopulation 702(1) are within the upper echelon 802.

If the upper echelon 802 is too large (i.e., too many chromosomes in the first subpopulation 702(1) belong to the upper echelon 802), then the method 100 may not converge with sufficient speed. That is, too many generations of child populations 152 will be needed to obtain a child chromosome with a sufficiently high (i.e., converged) fitness value v. In this case, the upper echelon 802 can be reduced in size (e.g., by raising the cutoff 804) to remove the chromosomes 700 that are less fit (i.e., have relatively smaller fitness values v). On the other hand, if the upper echelon 802 is too small, then there may not be enough randomness introduced to ensure that the child chromosomes converge to the optimal solution. The inventors have discovered that when the upper echelon 802 is selected to include those chromosomes with fitness values between the top one-half and the top one-fourth of those of the first subpopulation 702(1), then the subsequent generations of child chromosomes will converge to the optimal solution.

The first parent chromosome 900(1) may be randomly selected from the upper echelon 802 using weighted roulette-wheel selection with replacement such that the probability of randomly selecting a chromosome 700 within the upper echelon 802 is proportional to its fitness value v. In this case, the larger the fitness value v, the more likely the corresponding chromosome will be selected. Another method of randomly selecting the first parent chromosome 900(1) from the upper echelon 802 may be used without departing from the scope hereof.

The second parent chromosome 900(2) may be randomly selected from the second subpopulation 702(2) using weighted roulette-wheel selection with replacement. Although an upper echelon similar to the upper echelon 802 may be used with the second subpopulation 702(2), the use of two upper echelons, one for each of the subpopulations 702(1) and 702(2), may not introduce enough randomness. Another method of randomly selecting second first parent chromosome 900(1) from the second subpopulation 702(2) may be used without departing from the scope hereof.

Generating a Child Chromosome

Figure 9:
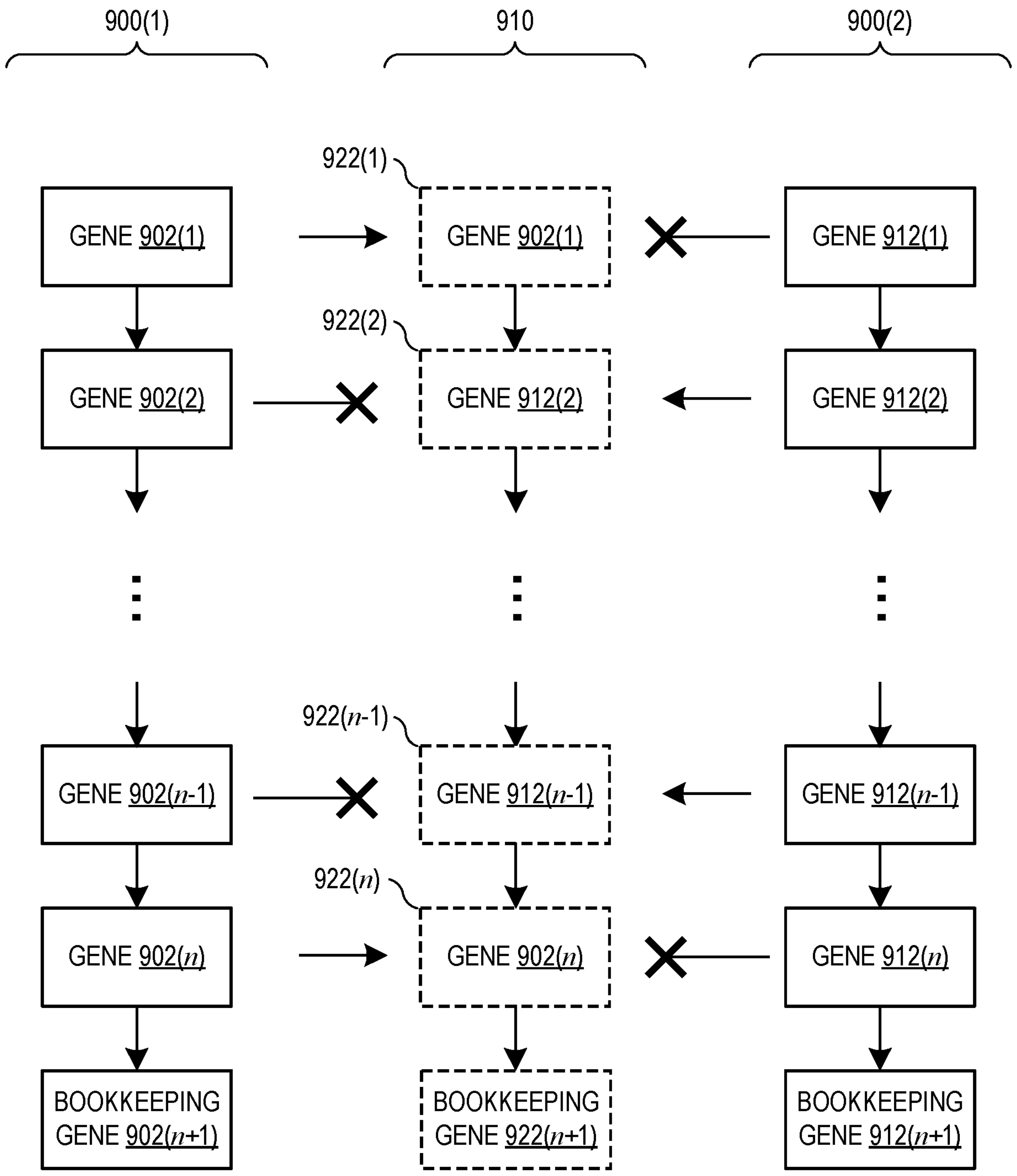
FIG. 9 illustrates a method for generating a child chromosome from the first parent chromosome of FIG. 8 and the second parent chromosome of FIG. 8, in an embodiment.

FIG. 9 illustrates a method for generating a child chromosome 910 from the first parent chromosome 900(1) and the second parent chromosome 900(2). The first parent chromosome 900(1) forms a linked sequence of n parent genes 902, while the second parent chromosome forms a linked sequence of n parent genes 912. For each of the parent genes 902($i$) of the first parent chromosome 900(1), either the parent gene 902($i$) or the parent gene 912($i$) is randomly selected and copied into a corresponding child gene 922($i$) of the child chromosome 910. In the example of FIG. 9, the first gene 902(1) of the first parent chromosome 900(1) was randomly selected and used to create the first child gene 922(1). Therefore, the first gene 912(1) of the second parent chromosome 900(2) was not used. For the second child gene 922(2), the second gene 912(2) of the second parent chromosome 900(2) was selected and used to create the second child gene 922(2). This process continues until the last child gene 922($n$) is randomly selected to be either the last gene 902($n$) of the first parent chromosome 900(1), as shown in the example of FIG. 9, or the last gene 912($n$) of the second parent chromosome 900(2).

In embodiments that use bookkeeping genes, a child bookkeeping gene 922($n$+1) may be constructed and linked to the last child gene 922($n$), similar to how a bookkeeping gene 902($n$+1) is linked to the last gene 902($n$) of the first parent chromosome 900(1), and how a bookkeeping gene 912($n$+1) is linked to the last gene 912($n$) of the second parent chromosome 900(2). Similar to the bookkeeping gene 202($n$+1) of FIG. 2, the child bookkeeping gene 922($n$+1) contains switches that activate/deactivate each of the previous n child genes 922. These switches may be randomly chosen upon creation of the child bookkeeping gene 922($n$+1). Alternatively, the switches may be copied from either the bookkeeping gene 902($n$+1) of the first parent chromosome 900(1) or the bookkeeping gene 912($n$+1) of the second parent chromosome 900(2). Alternatively, the switch for each child gene 922($i$) may be set equal to the corresponding switch of the same gene (either 902($i$) or 912($i$)) from the parent chromosome 900 from which it was selected. For example, the child bookkeeping gene 922($n$+1) in FIG. 9 may store: a first switch for the first child gene 922(1) that is set equal to a first switch for the first gene 902(1) stored in the bookkeeping gene 902($n$+1), a second switch for the second child gene 922(2) that is set equal to a second switch for the second gene 912(2) stored in the bookkeeping gene 912($n$+1), and so on. Other ways for initially constructing the child bookkeeping gene 922($n$+1) may be used without departing from the scope hereof.

Gene Mutation

Figure 10:
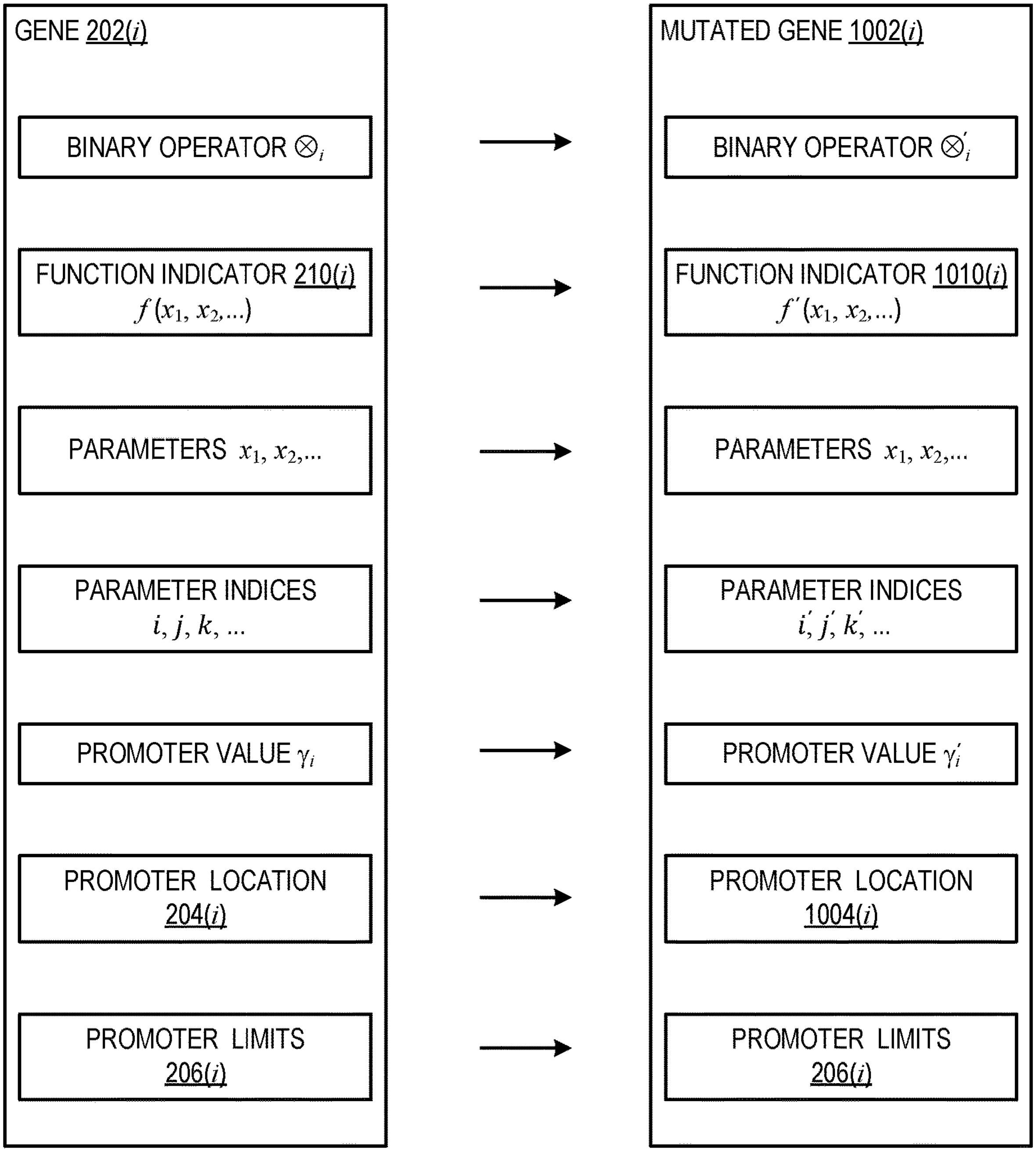
FIG. 10 illustrates a method for gene mutation, in embodiments.

FIG. 10 illustrates a method for gene mutation. Specifically, FIG. 10 shows a gene 202($i$) being mutated into a mutated gene 1002($i$). Gene mutation may be applied to any of the child genes 922(1)-922($n$) of the child chromosome 910 of FIG. 9 (i.e., gene mutation does not apply to the bookkeeping gene 922($n$+1)). Gene mutation may be applied randomly, i.e., for each child gene 922 selected for the child chromosome 910, a random number (e.g., between 0 and 1) is generated and compared to a threshold (e.g., 0.7). If the random number is greater than the threshold, then the child gene 922 undergoes gene mutation before being added to the child chromosome 910. If the random number is less than the threshold, then the child gene 922 is added to the child chromosome 910 without mutation.

To mutate the gene 202($i$) into the mutated gene 1002($i$), an additional random number is generated to determine if the original binary operator $\otimes_i$ stored in the gene 202($i$) should be replaced with a new binary operator $$\otimes_i'$$

randomly selected from the predetermined set $S_{\otimes}$ of binary operators. The probability that the original binary operator $\otimes_i$ should be replaced may be 50%. When the original binary operator $\otimes_i$ is not to be replaced, it may be copied to the mutated gene 1002($i$) as the new binary operator $$\otimes_i'.$$

When the binary operator $\otimes_i$ is to be replaced, then the new binary operator $$\otimes_i'$$

may be randomly selected from the set $S_\otimes$ and stored in the mutated gene 1002(*i*). Each of the binary operators in the set $S_\otimes$ may be randomly selected with an equal probability. For example, if there are ten binary operators in the set $S_\otimes$, then each will be selected with a probability of 0.1. Alternatively, some or all of the binary operators in the set $S_\otimes$ may be selected with unequal probabilities so that one or more of the binary operators (e.g., addition or multiplication) have a greater probability of being randomly selected than others (e.g., modulus). Since the original binary operator $\otimes_i$ is a member of the set $S_\otimes$, there is a non-zero probability that it will be randomly selected as the new binary operator $$\otimes_i'.$$

Another method of mutating the binary operator $\otimes_i$ may be used without departing from the scope hereof.

Another random number is generated to determine if the function indicator 210(*i*) identifying the original mathematical primitive $f$ should be replaced with a new function indicator 1010(*i*) identifying a new mathematical primitive $f'$ randomly selected from the predetermined set $S_f$ of mathematical primitives. The probability that the function indicator 210(*i*) should be replaced may be 50%. When the function indicator 210(*i*) is not to be replaced, it may be copied to the mutated gene 1002(*i*) as the new function indicator 1010(*i*). When the function indicator 210(*i*) is to be replaced, then the new mathematical primitive $f'$ may be randomly selected from the set $S_f$ and a corresponding indicator may be stored in the mutated gene 1002(*i*) as the new function indicator 1010(*i*). Each of the mathematical primitives in the set $S_f$ may be randomly selected with an equal probability. Alternatively, some of all of the mathematical primitives in the set $S_f$ may be selected with unequal probabilities so that one or more of the mathematical primitives have a greater probability of being randomly selected than others. Since the original mathematical primitive $f$ is a member of the set $S_f$, there is a non-zero probability that it will be randomly selected as the new mathematical primitive $f'$, in which case the new function indicator 1010(*i*) equals the function indicator 210(*i*). Another method of randomly replacing the function indicator 210(*i*) may be used without departing from the scope hereof.

When the new mathematical primitive $f'$ takes the same number of parameters as the original mathematical primitive $f$, then the original parameter indices (i, j, k, . . . ) stored in the gene 202(*i*) may be used with the new mathematical primitive $f'$. In this case, the original parameter indices may be copied into the mutated gene 1002(*i*) as new parameter indices (i',j', k', . . . ). When the new mathematical primitive $f'$ takes a greater number of parameters than the original mathematical primitive $f$, then a balance of one or more new parameter indices may be added to the original parameter indices to obtain the new parameter indices. Each of the new parameter indices may be randomly selected (e.g., with equal probability) from the columns of the matrix 500. The one or more new parameter indices may be combined with the original parameter indices in any way (e.g., appended to an ordered list of the original parameter indices, prepended to the ordered list, randomly interspersed, etc.). Alternatively, all of the original parameter indices may be replaced with new parameter indices selected randomly from the columns of the matrix 500. When the new mathematical primitive $f'$ takes fewer parameters than the original mathematical primitive $f$, then one or more of the original parameter indices may be discarded to form the new parameter indices. The one or more original parameter indices to be discarded may be selected either randomly from the original parameter indices, or deterministically (e.g., truncated from the ordered list of the original parameter indices). Alternatively, all of the original parameter indices may be replaced with new parameter indices selected randomly from the columns of the matrix 500. Another method of changing the number of parameter indices may be used without departing from the scope hereof.

When the function indicator 210(*i*) is not to be replaced, then one or more additional random numbers are generated to determine if each of the original parameter indices i, j, k, . . . should be replaced with a new parameter index randomly selected from the columns of the matrix 500. A single random number may be used to determine if all of the original parameter indices should be randomly replaced, or a different random number may be used to determine if each of the original parameter indices should be randomly replaced. In either case, when an original parameter index i is to be replaced, then one of the $n_f$ features 508 of the matrix 500 is randomly selected and the corresponding column index (from 1 to $n_f$) is stored in the mutated gene 1002(*i*) as a new parameter index i'. Each of the features 508 may be randomly selected with an equal probability. Alternatively, some or all of the features 508 may be selected with unequal probabilities so that one or more of the features 508 have a greater probability of being randomly selected than others. There is also a non-zero probability that the feature 508 corresponding to the original parameter index i will be randomly selected, in which case the new parameter index i' equals the original parameter index i. Another method of randomly replacing the parameter indices i, j, k, . . . may be used without departing from the scope hereof.

Another random number is generated to determine if the promoter value $\gamma_i$ should be replaced with a new promoter value $$\gamma_i'$$

randomly selected according to the promoter limits 206(*i*). The probability that the promoter value $\gamma_i$ should be replaced may be 50%. When the promoter value $\gamma_i$ is not to be replaced, it may be copied to the mutated gene 1002(*i*) as the new promoter value $\gamma_i$. When the promoter value $\gamma_i$ is to be replaced, then the new promoter value $$\gamma_i'$$

may be randomly selected and stored in the mutated gene 1002(*i*). The new promoter value $$\gamma_i'$$

may be randomly selected from a flat-top distribution between lower and upper promoter limits 206(*i*). Alternatively, the new promoter value $\gamma_i'$ may be randomly selected from a non-uniform distribution. The promoter limits 206(*i*) may be copied to the mutated gene 1002(*i*) for future mutations of the new promoter value.

$\gamma_i'$.

Mutation of the promoter location 204(*i*) depends on whether or not a new mathematical primitive $f'$ has been randomly selected for the mutated gene 1002(*i*), and whether the new mathematical primitive $f'$ takes the same number, a larger number, or a smaller number of parameters than the original mathematical primitive $f$. When the original mathematical primitive $f$ is not to be replaced, or when a new mathematical primitive $f'$ that takes the same number of parameters as the original mathematical primitive $f$ is randomly selected to replace the original mathematical primitive $f$, then the possible locations of the new promoter value $\gamma_i'$ in the mutated gene 1002(*i*) are the same as the possible locations of the original promoter value $\gamma_i$ in the gene 202(*i*). In these case, a random number may be generated to determine if the promoter location 204(*i*) should be replaced by a new promoter location 1004(*i*) selected randomly from the possible locations. If the promoter location 204(*i*) is not to be replaced, it may be copied to the mutated gene 1002(*i*) as the new promoter location 1004(*i*). If the promoter location 204(*i*) is to be replaced, then the new promoter location 1004(*i*) may be randomly selected from the possible locations. Each of the possible locations may be selected with an equal probability. For example, if there are three parameters, then there are four possible locations (i.e., the new promoter value $\gamma_i'$ can scale one of the three parameters or the result of the mathematical primitive $f'$), corresponding to a 25% probability of each possible location being randomly selected. Alternatively, some or all of the possible locations may be selected with unequal probabilities so that one or more of the possible locations have a greater probability of being randomly selected than others. Since the promoter location 204(*i*) is one of the possible locations, there is a non-zero probability that it will be randomly selected as the new promoter location 1004(*i*).

When the original mathematical primitive $f$ is replaced with a new mathematical primitive $f'$ that takes a greater number of parameters than the original mathematical primitive $f$, then a new number of possible locations of the new promoter value $\gamma_i'$ is greater than an old number of possible locations of the original promoter value $\gamma_i$. In this case, a random number may be generated to determine if the promoter location 204(*i*) should be replaced by a new promoter location 1004(*i*) selected randomly from new possible locations determined from the new mathematical primitive $f'$. If the promoter location 204(*i*) is not to be replaced, it may be copied to the mutated gene 1002(*i*) as the new promoter location 1004(*i*). If the promoter location 204(*i*) is to be replaced, then the new promoter location 1004(*i*) may be randomly selected from the new possible locations. Each of the new possible locations may be randomly selected with an equal probability. Alternatively, some or all of the new possible locations may be randomly selected with unequal probabilities.

In some embodiments, the new promoter location 1004(*i*) is randomly selected automatically upon replacement of the original mathematical primitive $f$ with a new mathematical primitive $f'$ having a greater number of parameters. In other embodiments, no new promoter location 1004(*i*) is randomly selected when the original mathematical primitive $f$ is replaced with a new mathematical primitive $f'$ having a greater number of parameters. In this case, the promoter location 204(*i*) may be copied to the mutated gene 1002(*i*) as the new promoter location 1004(*i*).

When the original mathematical primitive $f$ is replaced with a new mathematical primitive $f'$ that takes fewer parameters than the original mathematical primitive $f$, there is the possibility that the original promoter location 204(*i*) is no longer valid (e.g., it indicates that the promoter value $\gamma_i$ scales a parameter that was removed for the new mathematical primitive $f'$). In this case, the new promoter location 1004(*i*) may be randomly selected from updated possible locations determined from the number of parameters that the new mathematical primitive $f'$ takes. If the original promoter location 204(*i*) remains valid (i.e., it indicates that the promoter value $\gamma_i$ scales a parameter that is used by the new mathematical primitive $f'$), then a random number may be generated to determine if the promoter location 204(*i*) should be replaced by a new promoter location 1004(*i*) selected randomly from the updated possible locations. If the promoter location 204(*i*) is not to be replaced, it may be copied to the mutated gene 1002(*i*) as the new promoter location 1004(*i*). If the promoter location 204(*i*) is to be replaced, then the new promoter location 1004(*i*) may be randomly selected from the updated possible locations. Each of the updated possible locations may be randomly selected with an equal probability. Alternatively, some or all of the updated possible locations may be randomly selected with unequal probabilities.

Royalty Offspring

The method 100 may incorporate royal offspring in the child population 152 to enhance the likelihood that the fittest chromosome 158 of any generation is more fit than that of a previous generation. To implement royal offspring, the one or more chromosomes 700 of the first subpopulation 702(1) with the highest fitness values are identified as one or more royal "king" chromosomes 750 of the parent population 150 (see FIG. 7). Similarly, the one or more chromosomes 700 of the second subpopulation 702(2) with the highest fitness values are identified as one or more royal "queen" chromosomes 760 of the parent population 150. In the following discussion, FIG. 7 shows two king chromosomes 750(1) and

750(2), and two queen chromosomes 760(1) and 760(2). However, royal offspring in a generation may be produced with more or fewer king chromosomes 750 and more or fewer queen chromosomes 760. Thus, the number of king chromosomes 750 may differ from the number of queen chromosomes 760.

Each royal offspring is represented by a royal offspring chromosome that may be constructed using the method of child chromosome construction illustrated in FIG. 9 (see the section above titled "Generating a Child Chromosome"). Similarly, one or both of gene mutation and bookkeeping genes may also be implemented to add randomness to each royal offspring chromosome. One of the king chromosomes 750 may be used as the first parent chromosome 900(1), and one of the queen chromosomes 760 may be used as the second parent chromosome 900(2). One royal offspring chromosome may be constructed for each of the one or more king chromosomes 750 and for each of the one or more queen chromosomes 760. For example, in FIG. 7 the two king chromosomes 750 and two queen chromosomes 760 give rise to four royal offspring chromosomes: a first royal offspring chromosome constructed from the first king chromosome 750(1) and the first queen chromosome 760(1), a second royal offspring chromosome constructed from the second king chromosome 750(2) and the first queen chromosome 760(1), a third royal offspring chromosome constructed from the first king chromosome 750(1) and the second queen chromosome 760(2), and a fourth royal offspring chromosome constructed from the second king chromosome 750(2) and the second queen chromosome 760(2). All of the royal offspring chromosomes may then be added to (i.e., stored in) the child population 152.

In another implementation of royal offspring, all combinations and permutations of genes 202 from the royal chromosomes 750, 760 are constructed into royal offspring chromosomes. Since the number of combinations and permutations increases rapidly with the number of genes 202, and therefore becomes increasingly computational intensive, typically only a couple (e.g., four or six) royal chromosomes 750, 760 are considered.

The use of royal offspring, also known as elitist selection or royal prerogative, is based on the idea that the royal chromosomes 750, 760 are closer to the optimal solution than other chromosomes 700 in the parent population 150. Accordingly, it is beneficial (i.e., speeds up convergence) to guarantee that the royal chromosomes 750, 760 contribute to the child population 152. By contrast, there is no guarantee that any of the royal chromosomes 750, 760 will contribute to the child population 152 when child chromosomes 910 are constructed only via random selection of parent chromosomes 900 (e.g., within the upper echelon 802; see FIG. 8). When a royal chromosome 750, 760 is not close to the optimal solution, there is an increased likelihood that none of its royal offspring will be a royal chromosome 750, 760 of the next generation. In this case, it is more likely that one of the royal chromosomes 750, 760 of the next generation will have no royal parents, potentially establishing a new "genetic line" or "royal family".

After the royalty offspring chromosomes are added to the child population 152, additional child chromosomes 910 may be constructed and added to the child population 152 via random selection of parent chromosomes 900 (e.g., see the block 107 of FIG. 1). It should also be appreciated that when parent chromosomes 900 are randomly selected, it is possible that one of the king chromosomes 750 will be randomly selected as the first parent chromosome 900(1), and therefore will additionally contribute to the child population 152. In fact, when the parent chromosomes 900 are selected with replacement, each of the king chromosomes 750 may be randomly selected several times within a generation, thereby further contributing to the child population 152. The same argument holds for the queen chromosomes 760.

Additional Randomization Techniques

If, after a predetermined number of iterations of the method 100, the fittest chromosome 158 has not changed, then the method 100 has likely stagnated, preventing convergence to the optical solution. In this case, one or more additional randomization techniques can be used to "break" the stagnation. These randomization techniques may be used alone, or in any combination.

One randomization technique is increasing the size of the parent population 150. For example, the size of the parent population 150 may be doubled by generating twice as many child chromosomes in the previous generation, or by randomly generating additional chromosomes (e.g., prior to the block 102 of FIG. 1). To prevent the size of the parent population 150 from growing beyond available computing resources, a global maximum population size (e.g., 4,096) may be used as a "hard limit" on the size of the parent population 150. One or more of the extra chromosomes in the parent population 150 may have fitness values that are higher than what would have been achieved with the original size. A chromosome with a higher fitness value may succeed at breaking the stagnation.

Another randomization technique is reordering the genes within each of a plurality of the fittest chromosomes of the first subpopulation 702(1) and the second subpopulation 702(2). The plurality of fittest chromosomes may include the royal chromosomes 750, 760, as well as additional chromosomes. This reordering may result in one or more reordered chromosomes with higher fitness values than the original chromosomes (i.e., prior to reordering).

Another randomization technique is changing a mutation rate when generating a child chromosome. As described above in the section "Gene Mutation", a random number is used to determine if each of the binary operator $\otimes_i$, the function indicator **210(*i*), the parameter indices, the promoter value $\gamma_i$, and the promoter limits 206(*i*)** is to be mutated (i.e., replaced via random selection). Typically, the probability that any one of these values is to be replaced is 50%. However, this probability may be increased to produce more mutations (i.e., increasing the mutation rate). These extra mutations may result in chromosomes with higher fitness values.

Another randomization technique is decreasing the strictness by which the method 100 generates accuracy scores, thereby increasing the effective fitness of the population. This technique must be used with care as it increases the "coarseness" of the final model if it is not taken into account.

Another randomization technique is culling, whereby the chromosomes 700 of the parent population 150 with the lowest fitness values are replaced with new chromosomes 700 generated randomly.

Another randomization technique is to adjust the fault tolerance of the fitness function to allow for "approximate" solutions that are still acceptable but looser than originally anticipated.

Large data sets may tend to converge to the mean under various fitness functions. To avoid this convergence, the fitness function can be changed at different stages (i.e., at different iterations of the method 100). For example, the method 100 may use the Pearson correlation coefficient (i.e., Pearson's r) as a first fitness function to obtain a solution with a good shape, but is a mirror image of the data. Once an acceptable value for r has been obtained, the method 100 may switch to a second fitness function (e.g., an "accuracy-of-prediction" model) that maintains the shape but improves the accuracy of the solution.

Considering a solution as a mathematical "curve", different sections of the curve may be assigned to different equations (possible with a different number of dimensions in each part of the curve). Modifications can be made to the fitness function such that different output ranges are generated by different chromosomes of the population, i.e., each of the different chromosomes generates a "sub-equation" of the solution. In this case, the optimal solution (i.e., the ROSM 154) is a system of sub-equations, each defined within a corresponding domain/range.

When possible, it may be beneficial to only include mathematical primitives $f$ in the predetermined set $S_f$ that are domain specific (e.g., geometrics, economics, physics, biology, etc.). An extension of this idea is to allow mathematical primitives $f$ to be dynamically loaded (e.g., by means of a dynamically linked library (DLL) in the Windows operating system) such that only the user who compiled the mathematical primitive is aware of its semantics. Allowing such mathematical primitives to be supplied after the fact allows the present embodiments to be extended into problem domains that are not in the subject-matter expertise of anyone other than a third party who may wish to keep such details confidential.

System Embodiments

Figure 11:
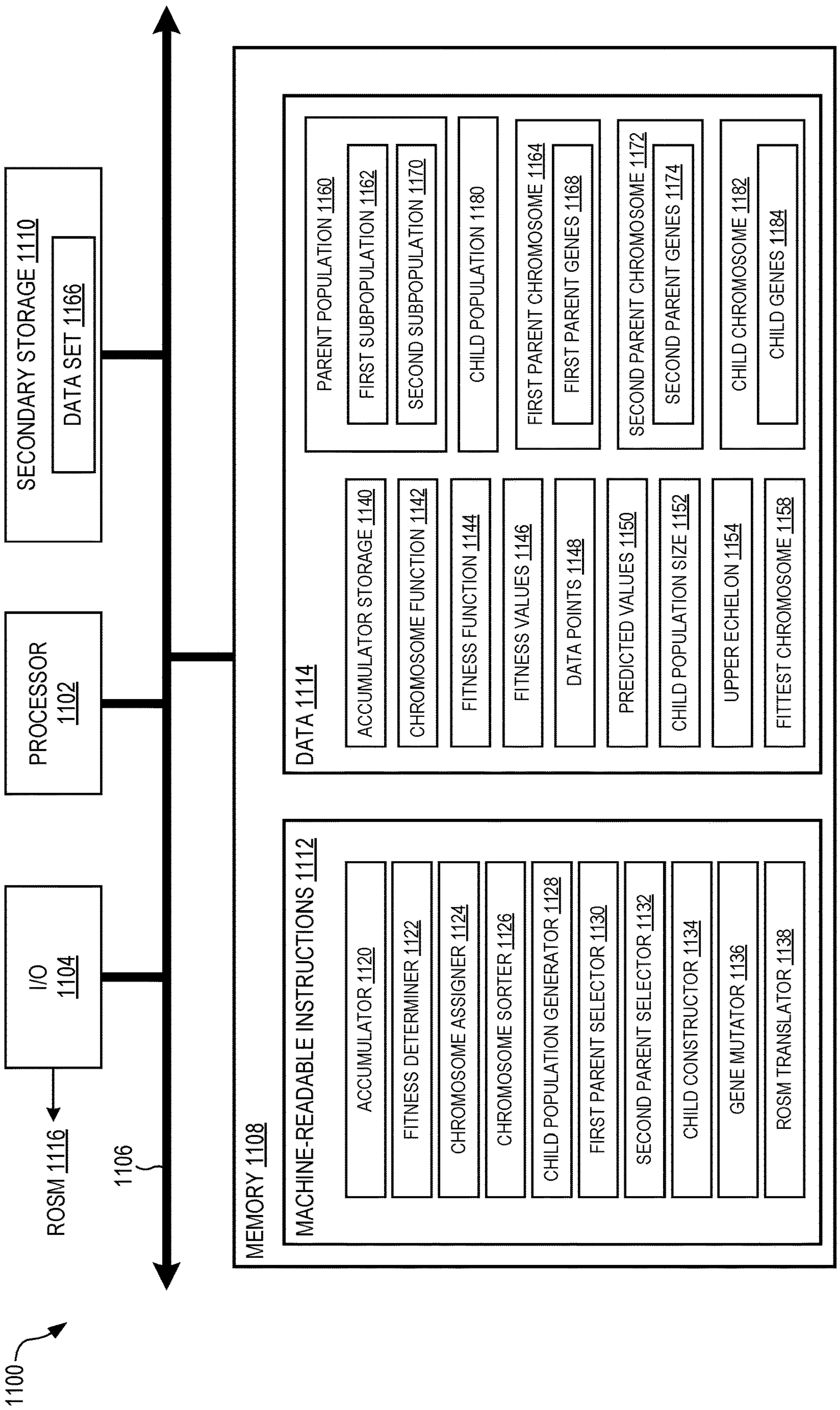
FIG. 11 shows an exemplary computing device 1100 with which the method embodiments described herein may be implemented, in embodiments.

FIG. 11 shows an exemplary computing device 1100 with which the method embodiments described herein may be implemented. The computing device 1100 includes a processor 1102, a memory 1108, and at least one secondary storage device 1110 that can communicate with each other over a system bus 1106. For example, the memory 1108 may be volatile RAM located proximate to the processor 1102, while the secondary storage device 1110 may be a hard disk drive, a solid-state drive, an optical storage device, or another type of persistent data storage. The secondary storage device 1110 may alternatively be accessed via an external network instead of the system bus 1106. Additional and/or other types of the memory 1108 and the secondary storage device 1110 may be used without departing from the scope hereof.

The computer system 1100 may include at least one I/O block 1104 that communicates with a peripheral device (not shown) to output a reduced-order surrogate model (ROSM) 1116. The I/O block 1104 is connected to the system bus 1106, and therefore can communicate with the processor 1102 and the memory 1108. The ROSM 1116 corresponds to the ROSM 154 of FIG. 1. In some embodiments, the peripheral device is a monitor or visual display that presents the ROSM 1116 in a human-readable format, i.e., as an analytic equation. Alternatively, the I/O block 1104 may implement a wired network interface (e.g., Ethernet, Infiniband, Fibre Channel, etc.), a wireless network interface (e.g., WiFi, Bluetooth, BLE, etc.), a cellular network interface (e.g., 4G, 5G, LTE), an optical network interface (e.g., SONET, SDH, IrDA, etc.), a multi-media card interface (e.g., SD card, Compact Flash, etc.), or another type of communication port through which the computer system 1100 can communicate to another device.

The processor 1102 may be any type of circuit capable of performing logic, control, and input/output operations. For example, the processor 1102 may include one or more of a microprocessor with one or more central processing unit (CPU) cores, a graphics processing unit (GPU), a digital signal processor (DSP), a field-programmable gate array (FPGA), a system-on-chip (SoC), and a microcontroller unit (MCU). The processor 1102 may also include a memory controller, bus controller, one or more co-processors, and/or other components that manage data flow between the processor 1102 and other components communicably coupled to the system bus 1106. In an embodiment, the computer system 1100 is a massively parallel multi-core system.

The memory 1108 stores machine-readable instructions 1112 that, when executed by the processor 1102, control the computer system 1100 to implement the functionality and methods described herein. In FIG. 11, the machine-readable instructions 1112 include an accumulator 1120 implements the accumulator 302 of FIGS. 3A-3B, a fitness determiner 1122 that implements the block 102 of the method 100 of FIG. 1, a chromosome assigner 1124 that implements the block 104 of the method 100, a chromosome sorter 1126 that implements the block 106 of the method 100, a child population generator 1128 that implements the block 107 of the method 100, a first parent selector 1130 that implements the subblock 108 of the method 100, a second parent selector 1132 that implements the subblock 110 of the method 100, a child constructor 1134 that implements the subblock 112 of the method 100, a gene mutator 1136 that implements gene mutation as described above in the section titled "Gene Mutation", and a ROSM translator 1138 that generates, from the chromosome function 1142 of the fittest chromosome 1158, the ROSM 1116 in a human-readable format, i.e., as an analytic mathematical equation. The memory 1108 may store additional machine-readable instructions 1112 (e.g., operating system instructions, I/O control instructions, etc.) without departing from the scope hereof.

The memory 1108 also stores data 1114 used by the processor 1102 when executing the machine-readable instructions 1112. In the example of FIG. 11, the data 1114 includes a parent population 1160 that represents the parent population 150 of FIGS. 1 and 7. Chromosomes of the parent population 1160 can belong to either a first subpopulation 1162 corresponding to the first subpopulation 702(1) of FIGS. 7 and 8, or a second subpopulation 1170 corresponding to the second subpopulation 702(2) of FIGS. 7 and 8. The data 1114 may also include a child population 1180 that represents the child population 152 of FIG. 1, accumulator storage 1140 that represents any partial chromosome function $P_i$ (e.g., see FIGS. 3A-3C), a chromosome function 1142 that represents any chromosome function P (e.g., see FIGS. 3C and 4), a fitness function 1144 that represents the fitness function F (e.g., see FIG. 6), fitness values 1146 that represent the fitness values v, predicted values 1150 that represent the predicted values $p_i$, a child population size 1152 that represents a number of child chromosomes in the child population 1180, an upper echelon 1154 that represents the upper echelon 802 of FIG. 8, a fittest chromosome 1158 that represents the fittest chromosome 158 of FIG. 1, a first parent chromosome 1164 that represents the first parent chromosome 900(1) of FIGS. 8 and 9, first parent genes 1168 that represent the parent genes 902 of FIG. 9, a second parent chromosome 1172 that represents the second parent chromosome 900(2) of FIGS. 8 and 9, second parent genes 1174 that represent the parent genes 912(2) of FIG. 9, a child chromosome 1182 that represents the child chromosome 910 of FIG. 9, and child genes 1184 that represent the child genes 922 of FIG. 9. The memory 1108 may store additional data 1114 without departing from the scope hereof.

The data 1114 also includes data points 1148 that represent some or all of the data set 160 of FIG. 1. Where the data set 160 is too large to fit entirely within the memory 1108, the data set 160 may be stored in the secondary storage device 1110 as a data set 1166. In this case, a portion of the data set 1166 is retrieved from the secondary storage device 1110 and stored in the memory 1108 as the data points 1148 when needed during execution of the machine-readable instructions 1112. For example, when the data set 1166 represents the matrix 500 of FIG. 5, the data points 1148 may represent one or more rows 504 of the matrix 500. The secondary storage device 1110 may store additional data (e.g., the parent population 1160, the child population 1180, the fittest chromosome 1158, etc.) and/or machine-readable instructions (e.g., any of the machine-readable instructions 1112) without departing from the scope hereof.

While FIG. 11 shows the chromosome function 1142 as part of the data 1114, it should be recognized that the chromosome function 1142 includes machine-readable instructions to be executed by the processor 1102. Thus, the chromosome function 1142 may be alternatively viewed as part of the machine-readable instructions 1112. More specifically, the accumulator 1120, when executed by the processor 1102, controls the computer system 1100 to construct the chromosome function 1142 from the genes of a chromosome (e.g., the first parent genes 1168 of the first parent chromosome 1164, or the child genes 1184 of the child chromosome 1182). The fitness determiner 1122, when executed by the processor 1102, controls the computer system 1100 to execute, with the processor 1102, the machine-readable instructions of the chromosome function 1142 using some or more of the data points 1148 as input. The result of the chromosome function 1142 is then stored as one of the predicted values 1150. After all of the predicted values 1150 have been generated, the fitness determiner 1122 may then use the fitness function 1144, with the predicted values 1150 and target values (e.g., the target values $\gamma_i$) of the data set 1166 to determine a fitness value for the chromosome function 1142.

Demonstration

FIGS. 12-15 show two examples of how the present embodiments may be used to generate a reduced-order surrogate model (e.g., the ROSM 154 of FIG. 1). In these examples, the method 100 of FIG. 1 was implemented as computer code (e.g., the machine-readable instructions 1112 of FIG. 11) running on a computer (e.g., the computing device 1100). In the first example, the data set 160 was the Breast Cancer Wisconsin (Diagnostic) Data Set (referred to herein as the "BCWD" data set 160), which can be found online at https://archive.ics.uci.edu/ml/datasets/Breast+Cancer+Wisconsin+(Diagnostic). The BCWD data set 160 has 569 samples, each representing one measurement of a tumor along with a clinician's binary determination as to whether the tumor is benign (357 samples) or malignant (212 samples). Each sample also contains values for 32 attributes, of which the following three were used as input variables to the reduced-order surrogate model: perimeter_worst, concave_points_mean, and concave_points_worst. A fourth input variable populated by noise was also included. The BCWD data set 160 was partitioned into a randomly selected training subset of 75% of the samples, with the remaining 25% of the samples forming a hold-out subset used for model validation. For the fitness function 1144, a loss function similar to balanced percentage accuracy was used.

FIG. 12 shows the output of the computer code while generating a reduced-order surrogate model for the BCWD data set 160. For each iteration that results in an improvement, the computer code outputs a line that starts with an iteration identifier of the form [i: M], where i is the iteration number and M is the maximum number of iterations. Following the iteration identifier are two accuracies of the form {PA: $P_1/P_2$}, where "PA" stands for "predictive accuracy", $P_1$ is the average of the predictive accuracies $P_T$ for true predictions and $P_F$ for false predictions (i.e., $P_1=(P_T+P_F)/2$), and $P_2$ is the overall accuracy. As indicated in FIG. 12, $P_1$ and $P_2$ are expressed as percentages. The predictive accuracies $P_T$, $P_F$, $P_1$, and $P_2$ are determined using the hold-out subset.

Following the two accuracies are several pieces of diagnostic data, each enclosed in braces, that quantify performance for that iteration. The diagnostic data includes the fitness value 1146 (denoted "L" for the value of the "loss" function), root-mean-square deviation ("RMSD"), mean average error ("MAE"), and Kendall's tau-b statistic ("tau-b"). Following the diagnostic data is the algebraic expression of the fittest chromosome 1158. Each line ends with the predictive accuracies [$P_F/P_T$] expressed as percentages.

The first line in FIG. 12, corresponding to the zeroth iteration, shows an initial model whose functional form was generated randomly based on the four input variables. The initial model is of the form x≥n, where x represents a Boolean equation for the target variable ~diagnosis and n is a numerical constant. The target variable ~diagnosis has the value "1" when signifying a malignant tumor and "0" when signifying a benign tumor. After the zeroth iteration, $P_F$=69.8% of the predictions against the hold-out subset that a tumor is benign are correct, and $P_T$=69.6% of the predictions against the hold-out subset that a tumor is malignant are correct. The second line in FIG. 12, corresponding to the first iteration, shows a first updated model that improves upon the initial model. The improvement is quantified by reduced loss and an increase in predictive accuracy to $P_F$=92.1% and $P_T$=92.0%.

The third line in FIG. 12, corresponding to the second iteration, shows a second updated model that improves upon the first updated model. Note that the initial model included the variable "noise" twice, and after the second iteration the variable "noise" has been removed, as expected since it cannot contribute to predictive accuracy. With the removal of the variable "noise", the order of the updated model has been reduced from four to three, and the accuracy against the hold-out subset has increased to $P_F$=93.6% and $P_T$=93.8%.

The fourth and fifth lines in FIG. 12 indicate that the third and fourth iterations each resulted in an updated model, as indicated by further reductions in loss. The sixth line in FIG. 12, corresponding to the eighth iteration, indicates that the fifth, sixth, and seventh iterations did not result in an improved equation. The code finished with the nineteenth iteration, which resulted in a final reduced-order surrogate model that showed only a slight improvement over the model of the ninth iteration. The accuracy of the final reduced-order surrogate model against the hold-out subset is $P_2$=95.8%.

FIG. 13 shows a spreadsheet used to verify the reduced-order surrogate model in the final line of FIG. 12. Each row of the spreadsheet corresponds to one sample from the hold-out subset. For clarity, only the first 31 samples of the hold-out subset are shown. The first three columns in FIG. 13 are populated with the three input variables from the hold-out subset. The fourth column contains predicted values ("0"=False, "1"=True) generated by the final reduced-order surrogate model. The fifth column is populated with the actual values of the clinician's determinations. In the last column, each cell contains a "1" (and referred to as a "hit")

if the predicted and actual values match, or a "0" if the values do not match. Note that all but one of the shown hold-out samples are hits.

In the second example, the data set 160 was a synthetic data set having 250 rows and three columns representing the radius $r_s$ of a sphere, the radius $r_c$ of a cone, and the height h of the cone. The target variable V is the sum of the volumes of the sphere and the cone, i.e., $$V=4\pi r_s^2/3+\pi r_c^2 h/3.$$

One-half of the rows were randomly selected for training, with the remaining half forming a hold-out subset. Mean-squared error was used for the loss function.

FIG. 14 shows the output of the computer code while generating a reduced-order surrogate model for the synthetic data set 160. In FIG. 14, $r_s$ is denoted "sphere_radius", $r_c$ is denoted "cone_radius", h is denoted "cone_height", and the target variable V is denoted "~_V". Note that the second example differs from the first example in that the target variable is continuous-valued rather than Boolean. Thus, $P_1$ in FIG. 14 is the "proximity accuracy", defined as the percentage of predictions falling within one RMS deviation of the actual value.

In the first line of FIG. 14, the zeroth iteration indicates a low correlation of the initial model to the hold-out subset, with r=−0.109. By the second iteration, this correlation has increased significantly to r=0.608. By the ninth and final iteration, the final reduced-order surrogate model shows perfect correlation (i.e., r=1) to the hold-out subset, and is clearly readable as the relationship used to generate the synthetic data set 160.

FIG. 15 shows a spreadsheet used to verify the reduced-order surrogate model in the final line of FIG. 14. For clarity, only a portion of the hold-out subset is shown. The first three columns of the spreadsheet are populated with the three input variables $r_s$, $r_c$, and h from the hold-out subset. The fourth column contains the predicted values generated by the final reduced-order surrogate model. The fifth column is populated with the actual values. As expected from the perfect correlation, the predicted and actual values match exactly.

Changes may be made in the above methods and systems without departing from the scope hereof. It should thus be noted that the matter contained in the above description or shown in the accompanying drawings should be interpreted as illustrative and not in a limiting sense. The following claims are intended to cover all generic and specific features described herein, as well as all statements of the scope of the present method and system, which, as a matter of language, might be said to fall therebetween.

What is claimed is:

1. A method for generating a reduced-order surrogate model that approximates a data set, comprising:

determining, for each parent chromosome of a population of parent chromosomes, a fitness value by applying the data set to a chromosome function constructed from a sequence of genes of said each parent chromosome;

randomly assigning each parent chromosome into one of a first subpopulation of parent chromosomes and a second subpopulation of parent chromosomes;

ordering the first subpopulation of parent chromosomes based on their fitness values;

generating a population of child chromosomes by iteratively:

randomly selecting, from the first subpopulation, a first parent chromosome having a fitness value within an upper echelon of the fitness values of the parent chromosomes of the first subpopulation, randomly selecting a second parent chromosome from the second subpopulation, and constructing a child chromosome of the population of child chromosomes by, for each gene starting from a first gene of a linked sequence of parent genes of the first parent chromosome, randomly selecting either (i) a gene of the first parent chromosome at a corresponding gene position or (ii) a gene of the second parent chromosome at the corresponding gene position, and copying the selected gene into a corresponding child gene of the child chromosome, and continuing until a last gene of the linked sequence of parent genes has been randomly selected and copied into a last child gene of the child chromosome;

executing computer code to generate a plurality of reduced-order surrogate models based, at least in part, on the population of child chromosomes iteratively generated;

identifying the reduced-order surrogate model based, at least in part, on the generation of the plurality of reduced-order surrogate models, the reduced-order surrogate model identified further based on a plurality of outputs generated by executing the computer code and an accuracy value associated with each of the plurality of outputs, the reduced-order surrogate model represented by a fittest chromosome function constructed from a fittest child chromosome having a highest fitness value of the population of child chromosomes;

parsing the sequence of genes of the fittest child chromosome to determine the fittest chromosome function in a human-readable format, wherein the human-readable format comprises a mathematical equation representing the reduced-order surrogate model;

loading the mathematical equation into a computer program configured to parse mathematical expressions to perform validation or prediction; and performing by the computer program, computer-implemented processing utilizing the loaded mathematical equation representing the reduced-order surrogate model to generate verification data for the loaded mathematical equation, the verification data including one or more predicted values determined by the loaded mathematical equation based on an alternative data set comprising one or more data samples partitioned from the data set prior to determining the fitness value for each parent chromosome of the population of parent chromosomes.

2. The method of claim 1, further comprising:

outputting, as the reduced-order surrogate model, the mathematical equation representing the reduced-order surrogate model in the human-readable format for direct copy and paste into the computer program configured to parse mathematical expressions for validation or prediction.

3. The method of claim 1, wherein:

each of the genes stores:

a function indicator identifying one mathematical primitive *f* rom a set of mathematical primitives, one or more parameter indicators identifying one or more corresponding parameters, of the data set, to be inputted to the one mathematical primitive, a binary operator from a set of binary operators, a promoter value, and a promoter location identifying either (i) which of the one or more parameters the promoter value scales, or (ii) that the promoter value scales an output of the one mathematical primitive; and said generating the population of child chromosomes further includes randomly determining to mutate each child gene, and mutating said each child gene determined to be mutated by:

updating the function indicator to identify a new mathematical primitive randomly selected from the set of mathematical primitives;

updating each of the one or more parameter indicators to identify a new parameter randomly selected from the parameters of the data set;

replacing the binary operator with a new binary operator randomly selected from the set of binary operators;

replacing the promoter value with a randomly selected new promoter; and replacing the promoter location with a randomly selected new promoter location.

4. The method of claim 3, wherein:

each parent chromosome further includes a bookkeeping gene that stores, for each gene of the sequence of genes of said each parent chromosome, a binary activation indicator identifying if said each gene is active or dormant; and said mutating further includes replacing the binary activation indicator for said each child gene with a randomly selected new binary activation indicator.

5. The method of claim 1, wherein:

each of the genes stores:

a function indicator identifying one mathematical primitive ƒ rom a set of mathematical primitives, one or more parameter indicators identifying one or more corresponding parameters, of the data set, to be inputted to the one mathematical primitive, a binary operator from a set of binary operators, a promoter value, and a promoter location identifying either (i) which of the one or more parameters the promoter value scales, or (ii) that the promoter value scales an output of the one mathematical primitive;

the method further comprises constructing the chromosome function from the sequence of genes of said each parent chromosome by:

retrieving, from a first gene of said each parent chromosome, the function indicator, the one or more parameter indicators, the promoter value, and the promoter location; and storing, in an accumulator, machine-readable instructions that, when executed by a processor, call the mathematical primitive identified by the function indicator retrieved from the first gene, the machine-readable instructions being configured to retrieve and pass to the mathematical primitive the one or more parameters identified by the one or more parameter indicators retrieved from the first gene, the machine-readable instructions being further configured to multiply either (i) one of the one or more parameters, or (ii) the output of the mathematical primitive by the promoter value retrieved from the first gene according to the promoter location retrieved from the first gene;

sequentially accessing each subsequent gene of the sequence of genes of said each parent chromosome, and for each subsequent gene:

retrieving the function indicator, the one or more parameter indicators, the promoter value, and the promoter location stored in said each subsequent gene;

generating subsequent machine-readable instructions that, when executed by the processor, call the mathematical primitive identified by the function indicator retrieved from said each subsequent gene, the subsequent machine-readable instructions being configured to retrieve and pass to the mathematical primitive the one or more parameters identified by the one or more parameter indicators retrieved from said each subsequent gene, the machine-readable instructions being further configured to multiply either (i) one of the one or more parameters, or (ii) the output of the mathematical primitive by the promoter value retrieved from said each subsequent gene according to the promoter location retrieved from said each subsequent gene;

generating updated machine-readable instructions by combining the subsequent machine-readable instructions with the machine-readable instructions stored in the accumulator according to the binary operator stored in said each subsequent gene; and replacing the machine-readable instructions stored in the accumulator with the updated machine-readable instructions; and final machine-readable instructions stored in the accumulator after said sequentially accessing represent the chromosome function.

6. The method of claim 5, wherein:

each parent chromosome further includes a bookkeeping gene that stores, for each gene of the sequence of genes of said each parent chromosome, a corresponding binary activation indicator identifying said each gene as either active or dormant; and said sequentially accessing each subsequent gene includes skipping said each subsequent gene if the corresponding binary activation indicator identifies said each subsequent gene as dormant.

7. The method of claim 6, wherein the first gene of said each parent chromosome is a first gene of the sequence of genes identified by the corresponding binary activation indicator as being active.

8. The method of claim 1, wherein:

the data set comprises a data matrix having a plurality of rows and a plurality of columns representing a corresponding plurality of parameters;

said applying the data set to the chromosome function includes, for each row of the plurality of rows, applying the chromosome function to said each row to obtain a predicted value for said each row; and said determining the fitness value is based on the predicted value for each row.

9. The method of claim 8, wherein:

the data matrix further includes at least one additional column storing at least one target value for each row; and said determining the fitness value is based on the predicted value and the at least one target value for each row.

10. The method of claim 1, wherein:

each parent chromosome further includes a bookkeeping gene that stores, for each gene of the sequence of genes of said each parent chromosome, a binary activation indicator identifying if said each gene is active or dormant; and the method further includes constructing, for each parent chromosome, the chromosome function from the sequence of genes of said each parent chromosome, based on each binary activation indicator stored in the bookkeeping gene.

11. A system for generating a reduced-order surrogate model that approximates a data set, comprising:

a processor;

a secondary storage device communicably coupled with the processor and configured to store the data set; and a memory communicably coupled with the processor and storing machine-readable instructions that, when executed by the processor, control the system to:

determine, for each parent chromosome of a population of parent chromosomes, a fitness value by applying the data set to a chromosome function constructed from a sequence of genes of said each parent chromosome, randomly assign each parent chromosome into one of a first subpopulation of parent chromosomes and a second subpopulation of parent chromosomes, order the first subpopulation of parent chromosomes based on their fitness values, generate a population of child chromosomes by iteratively:

(i) randomly selecting, from the first subpopulation, a first parent chromosome whose fitness value is within an upper echelon of the fitness values of the parent chromosomes of the first subpopulation, (ii) randomly selecting a second parent chromosome from the second subpopulation, and (iii) constructing a child chromosome of the population of child chromosomes by, for each gene starting from a first gene of a linked sequence of parent genes of the first parent chromosome, randomly selecting either (i) a gene of the first parent chromosome at a corresponding gene position or (ii) a gene of the second parent chromosome at the corresponding gene position, and copying the selected gene into a corresponding child gene of the child chromosome, and continuing until a last gene of the linked sequence of parent genes has been randomly selected and copied into a last child gene of the child chromosome;

execute computer code to generate a plurality of reduced-order surrogate models based, at least in part, on the population of child chromosomes iteratively generated, identify the reduced-order surrogate model based, at least in part, on the generation of the plurality of reduced-order surrogate models, the reduced-order surrogate model identified further based on a plurality of outputs generated by executing the computer code, the reduced-order surrogate model represented by a fittest chromosome function constructed from a fittest child chromosome having a highest fitness value of the population of child chromosomes, parse the sequence of genes of the fittest child chromosome to determine the fittest chromosome function in a human-readable format, wherein the human-readable format comprises a mathematical equation representing the reduced-order surrogate model, load the mathematical equation into a computer program configured to parse mathematical expressions to perform validation or prediction, and perform, by the computer program, computer-implemented processing utilizing the loaded mathematical equation representing the reduced-order surrogate model to generate verification data for the loaded mathematical equation, the verification data including one or more predicted values determined by the loaded mathematical equation based on an alternative data set comprising one or more data samples partitioned from the data set prior to determining the fitness value for each parent chromosome of the population of parent chromosomes.

12. The system of claim 11, the memory storing additional machine-readable instructions that, when executed by the processor, control the system to:

output, as the reduced-order surrogate model, the mathematical equation in the human-readable format for direct copy and paste into the computer program configured to parse mathematical expressions for validation or prediction.

13. The system of claim 11, wherein:

each of the genes stores:

a function indicator identifying one mathematical primitive *f* rom a set of mathematical primitives;

one or more parameter indicators identifying one or more corresponding parameters, of the data set, to be inputted to the one mathematical primitive;

a binary operator from a set of binary operators;

a promoter value; and a promoter location identifying either (i) which of the one or more parameters the promoter value scales, or (ii) that the promoter value scales an output of the one mathematical primitive; and the machine-readable instructions that, when executed by the processor, control the system to iteratively generate the population of child chromosomes include machine-readable instructions that, when executed by the processor, control the system to randomly determine to mutate each child gene, and to mutate each said child gene determined to be mutated by:

updating the function indicator to identify a new mathematical primitive randomly selected from the set of mathematical primitives;

updating each of the one or more parameter indicators to identify a new parameter randomly selected from the parameters of the data set;

replacing the binary operator with a new binary operator randomly selected from the set of binary operators;

replacing the promoter value with a randomly selected new promoter; and replacing the promoter location with a randomly selected new promoter location.

14. The system of claim 13, wherein:

each parent chromosome further includes a bookkeeping gene that stores, for each gene of the sequence of genes of said each parent chromosome, a binary activation indicator identifying if said each gene is active or dormant; and the machine-readable instructions that, when executed by the processor, control the system to mutate include machine-readable instructions that, when executed by the processor, control the system to replace the binary activation indicator for said each child gene with a randomly selected new binary activation indicator.

15. The system of claim 11, wherein:

each of the genes stores:

a function indicator identifying one mathematical primitive ƒ rom a set of mathematical primitives;

one or more parameter indicators identifying one or more corresponding parameters, of the data set, to be inputted to the one mathematical primitive;

a binary operator from a set of binary operators;

a promoter value; and a promoter location identifying either (i) which of the one or more parameters the promoter value scales, or (ii) that the promoter value scales an output of the one mathematical primitive;

the memory stores additional machine-readable instructions that, when executed by the processor, control the system to construct the chromosome function from the sequence of genes of said each parent chromosome by:

retrieving, from a first gene of said each parent chromosome, the function indicator, the one or more parameter indicators, the promoter value, and the promoter location;

storing, in an accumulator, machine-readable instructions that, when executed by a processor, call the mathematical primitive identified by the function indicator retrieved from the first gene, the machine-readable instructions being configured to retrieve and pass to the mathematical primitive the one or more parameters identified by the one or more parameter indicators retrieved from the first gene, the machine-readable instructions being further configured to multiply either (i) one of the one or more parameters, or (ii) the output of the mathematical primitive by the promoter value retrieved from the first gene according to the promoter location retrieved from the first gene;

sequentially accessing each subsequent gene of the sequence of genes of said each parent chromosome, and for each subsequent gene:

retrieving the function indicator, the one or more parameter indicators, the promoter value, and the promoter location stored in said each subsequent gene;

generating subsequent machine-readable instructions that, when executed by the processor, call the mathematical primitive identified by the function indicator retrieved from said each subsequent gene, the subsequent machine-readable instructions being configured to retrieve and pass to the mathematical primitive the one or more parameters identified by the one or more parameter indicators retrieved from said each subsequent gene, the machine-readable instructions being further configured to multiply either (i) one of the one or more parameters, or (ii) the output of the mathematical primitive by the promoter value retrieved from said each subsequent gene according to the promoter location retrieved from said each subsequent gene;

generating updated machine-readable instructions by combining the subsequent machine-readable instructions with the machine-readable instructions stored in the accumulator according to the binary operator stored in said each subsequent gene; and replacing the machine-readable instructions stored in the accumulator with the updated machine-readable instructions; and final machine-readable instructions stored in the accumulator after said sequentially accessing represent the chromosome function.

16. The system of claim 15, wherein:

each parent chromosome further includes a bookkeeping gene that stores, for each gene of the sequence of genes of said each parent chromosome, a corresponding binary activation indicator identifying said each gene as either active or dormant; and the machine-readable instructions that, when executed by the processor, control the system to construct the chromosome function by sequentially accessing each subsequent gene include machine-readable instructions that, when executed by the processor, control the system to skip said each subsequent gene if the corresponding binary activation indicator identifies said each subsequent gene as dormant.

17. The system of claim 16, wherein the first gene of said each parent chromosome is a first gene of the sequence of genes identified by the corresponding binary activation indicator as being active.

18. The system of claim 11, wherein:

the data set comprises a data matrix having a plurality of rows and a plurality of columns representing a corresponding plurality of parameters; and the machine-readable instructions that, when executed by the processor, control the system to determine the fitness value by applying the data set to the chromosome function include machine-readable instructions that, when executed by the processor, control the system to apply the chromosome function to each row of the plurality of rows to obtain a predicted value for said each row; and the machine-readable instructions that, when executed by the processor, control the system to determine the fitness value include machine-readable instructions that, when executed by the processor, control the system to determine the fitness value based on the predicted value for each row.

19. The system of claim 18, wherein:

the data matrix further includes at least one additional column storing at least one target value for each row; and the machine-readable instructions that, when executed by the processor, control the system to determine the fitness value include machine-readable instructions that, when executed by the processor, control the system to determine the fitness value based on the predicted value and the at least one target value for each row.

20. The system of claim 11, wherein:

each parent chromosome further includes a bookkeeping gene that stores, for each gene of the sequence of genes of said each parent chromosome, a binary activation indicator identifying if said each gene is active or dormant; and the memory stores additional machine-readable instructions that, when executed by the processor, control the system to construct, for each parent chromosome, the chromosome function from the sequence of genes of said each parent chromosome based on each binary activation indicator stored in the bookkeeping gene.

* * * * *